(12) United States Patent
Kuwagaito et al.

(10) Patent No.: US 9,042,024 B2
(45) Date of Patent: May 26, 2015

(54) SCANNER LENS AND METHOD FOR PRODUCING THE SAME

(71) Applicant: Nalux Co., Ltd., Osaka-shi, Osaka (JP)

(72) Inventors: Tomohito Kuwagaito, Osaka (JP); Yosuke Sakohira, Osaka (JP); Daisuke Seki, Osaka (JP)

(73) Assignee: NALUX CO., LTD., Osaka-shi, Osaka (JP)

( * ) Notice: Subject to any disclaimer, the term of this patent is extended or adjusted under 35 U.S.C. 154(b) by 244 days.

(21) Appl. No.: 13/852,273

(22) Filed: Mar. 28, 2013

(65) Prior Publication Data
US 2013/0258489 A1  Oct. 3, 2013

(30) Foreign Application Priority Data

Mar. 29, 2012 (JP) ................................. 2012-076704

(51) Int. Cl.
*G02B 26/08* (2006.01)
*G02B 3/00* (2006.01)
*G02B 3/06* (2006.01)
*G02B 26/12* (2006.01)
*G02B 1/04* (2006.01)

(52) U.S. Cl.
CPC . *G02B 3/00* (2013.01); *G02B 1/043* (2013.01); *G02B 3/06* (2013.01); *G02B 26/125* (2013.01)

(58) Field of Classification Search
CPC ...... G02B 1/041; G02B 26/125; G02B 26/10; G02B 3/00; G02B 26/08; G02B 26/0875; G02B 13/0025; G02B 1/00; G02B 27/0916; B29L 2011/0016

USPC ............. 359/642, 196.1, 197.1, 205.1, 206.1; 264/1.1, 1.32, 2.1, 2.5

See application file for complete search history.

(56) References Cited

U.S. PATENT DOCUMENTS 5,877,883 A *  3/1999  Inoue et al. ................ 359/196.1
2004/0260028 A1* 12/2004  Sone .............................. 525/271

FOREIGN PATENT DOCUMENTS

JP  05-303010  11/1993

* cited by examiner

*Primary Examiner* — Evelyn A Lester
(74) *Attorney, Agent, or Firm* — Squire Patton Boggs (US) LLP

(57) ABSTRACT

The method includes the steps of: obtaining lateral magnification of an optical scanning system; obtaining the maximum value of thickness in the optical axis direction of an scanner lens; obtaining allowance b on one side and beam diameter a in the vertical scanning direction in the lens; and obtaining width h in the vertical scanning direction of the lens by the following expression $$h=a+2b.$$

The allowance b is a product of the maximum value of thickness in the optical axis direction of the lens and a coefficient, and the coefficient is determined according to the lateral magnification of the system in such a way that the maximum value of movement of the focal point of the lens due to moisture absorption is made smaller than or equal to a predetermined value.

4 Claims, 21 Drawing Sheets

SCANNER LENS AND METHOD FOR PRODUCING THE SAME

FIELD OF THE INVENTION

The present invention relates to a scanner lens used in scanning optical systems of printers, scanners and the like and to a method for producing it.

BACKGROUND ART

It is a well known fact that in scanning optical systems of printers, scanners and the like the scanner lens absorbs moisture and the focal point in the vertical scanning direction moves in such a way that the focal length increases (for example, Patent Document 1). Such a movement of the focal point due to moisture absorption is generated by a change in refractive index inside the scanner lens caused by moisture absorption. Accordingly, a method in which an appropriate allowance is added to width in the vertical scanning direction of the scanner lens has been proposed (for example, Patent Document 1).

However, conventionally, an allowance of width in the vertical scanning direction of the scanner lens has been determined by shape of the scanner lens alone, and characteristics of the scanning optical system have not been taken into account. In other words, a scanner lens and a method for producing it in which an allowance of width in the vertical scanning direction of the scanner lens is determined in consideration of characteristics of the scanning optical system to be used, have not been developed.
Patent Document 1: JP5-303010A Accordingly, there is a need for a scanner lens and a method for producing it in which an allowance of width in the vertical scanning direction of the scanner lens is determined in consideration of characteristics of the scanning optical system to be used.

SUMMARY OF THE INVENTION

A method for producing a scanner lens according to the present invention is that for producing a scanner lens of plastic used in an optical scanning system. The method includes the steps of: obtaining lateral magnification of the optical scanning system; obtaining the maximum value of thickness in the optical axis direction of the scanner lens; obtaining allowance b on one side and beam diameter a in the vertical scanning direction in the scanner lens; and obtaining width h in the vertical scanning direction of the scanner lens by the following expression $h=a+2b$.

The allowance b is a product of the maximum value of thickness in the optical axis direction of the scanner lens and a coefficient, and the coefficient is determined according to the lateral magnification of the optical scanning system in such a way that the maximum value of movement of the focal point of the scanner lens due to moisture absorption is made smaller than or equal to a predetermined value independently of the lateral magnification of the optical scanning system.

A scanner lens according to the present invention is a scanner lens of plastic used in an optical scanning system. Width h in the vertical scanning direction of the scanner lens is determined by the following expression $h=a+2b$ where a represents beam diameter in the vertical scanning direction in the scanner lens and b represents allowance on one side. The allowance b is a product of the maximum value of thickness in the optical axis direction of the scanner lens and a coefficient, and the coefficient is determined according to the lateral magnification of the optical scanning system in such a way that the maximum value of movement of the focal point of the scanner lens due to moisture absorption is made smaller than or equal to a predetermined value independently of the lateral magnification of the optical scanning system.

According to the findings of the inventors, with increasing lateral magnification of the optical scanning system, an amount of movement of the focal point of the scanner lens due to moisture absorption increases. Accordingly, if allowance of width in the vertical scanning direction of the scanner lens is determined in such a way that the allowance increases with increasing lateral magnification of the optical scanning system, the amount of movement of the focal point of the scanner lens, which increases with increasing lateral magnification can be reduced.

In the method for producing a scanner lens according to the present invention, the allowance is determined in such a way that the amount of movement of the focal point of the scanner lens due to moisture absorption is not affected by lateral magnification of the optical scanning system.

According to the present invention, an allowance of width in the vertical scanning direction of the scanner lens can be efficiently determined in consideration of lateral magnification of the optical scanning system.

In the method for producing a scanner lens according to the present invention, the allowance is determined in such a way that the value of the allowance is proportional to a coefficient which increases with increasing lateral magnification of the optical scanning system and the maximum value of thickness in the optical axis direction of the scanner lens.

According to the present invention, an allowance of width in the vertical scanning direction of the scanner lens can be efficiently determined in consideration of lateral magnification of the optical scanning system and the maximum value of thickness in the optical axis direction of the scanner lens.

MODE FOR CARRYING OUT THE INVENTION

Figure 13A:
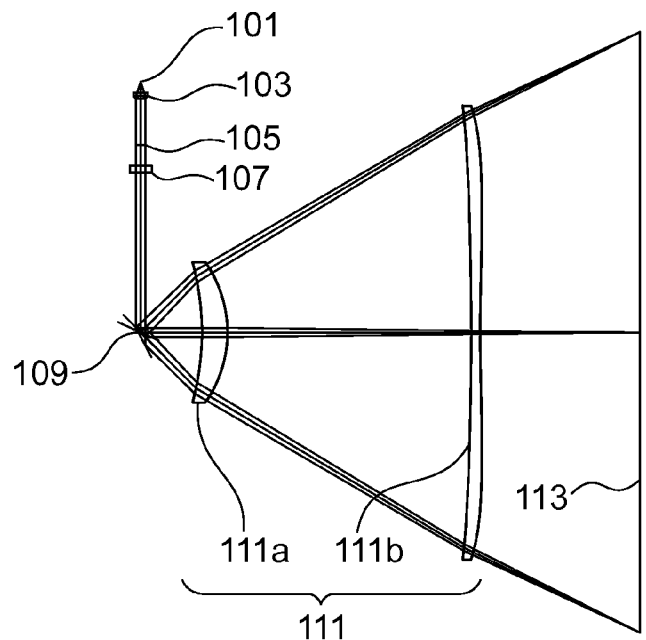
FIG. 13A is a cross-sectional view of the scanning optical system of Example 1.

FIG. 13A is a cross-sectional view of a scanning optical system. The cross section is in the main scanning direction and contains the optical axis. Light emitted by a laser diode light source 101 is collimated by a collimator lens 103, passes through a diaphragm 105 and a cylindrical lens 107, is reflected by a polygon mirror 109, passes through a first scanner lens 111a and a second scanner lens 111b, and collected on a scanned surface 113.

Figure 1:
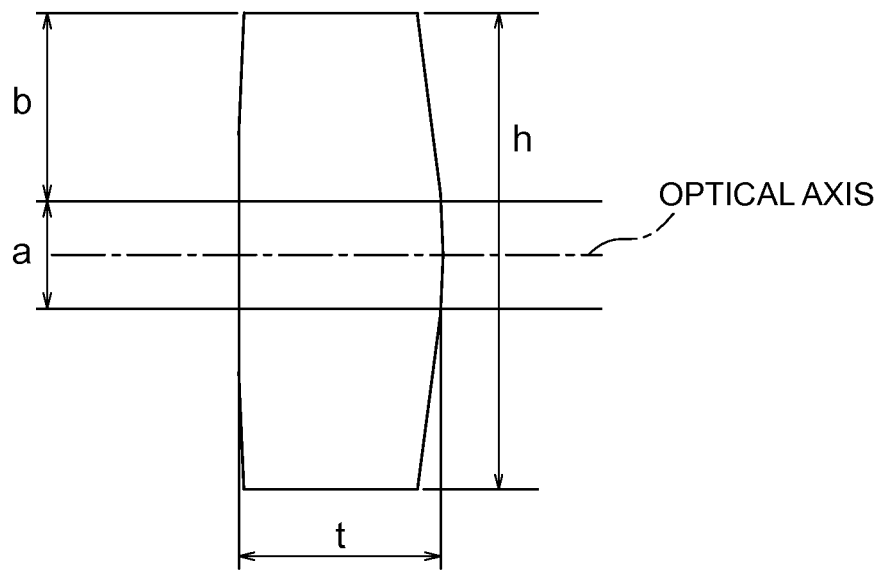
FIG. 1 shows a cross section of the second scanner lens, which is perpendicular to the main scanning direction.

FIG. 1 shows a cross section of the second scanner lens 111b, which is perpendicular to the main scanning direction. In the cross section shown in FIG. 1, thickness in the optical axis direction is represented as t while width in the vertical scanning direction is represented as h. Thickness in the optical axis direction t is the maximum thickness in the cross-section. Assuming that beam diameter is a and an allowance of width on one side in the vertical scanning direction is b, width in the vertical scanning direction h can be given by the following expression.

$$h = a + 2b$$

In many cases, the second scanner lens 111b is made of low-cost poly-methyl methacrylate (PMMA). PMMA tends to absorb a large amount of moisture and therefore tends to cause a movement of the focal point due to moisture absorption.

Figure 2:
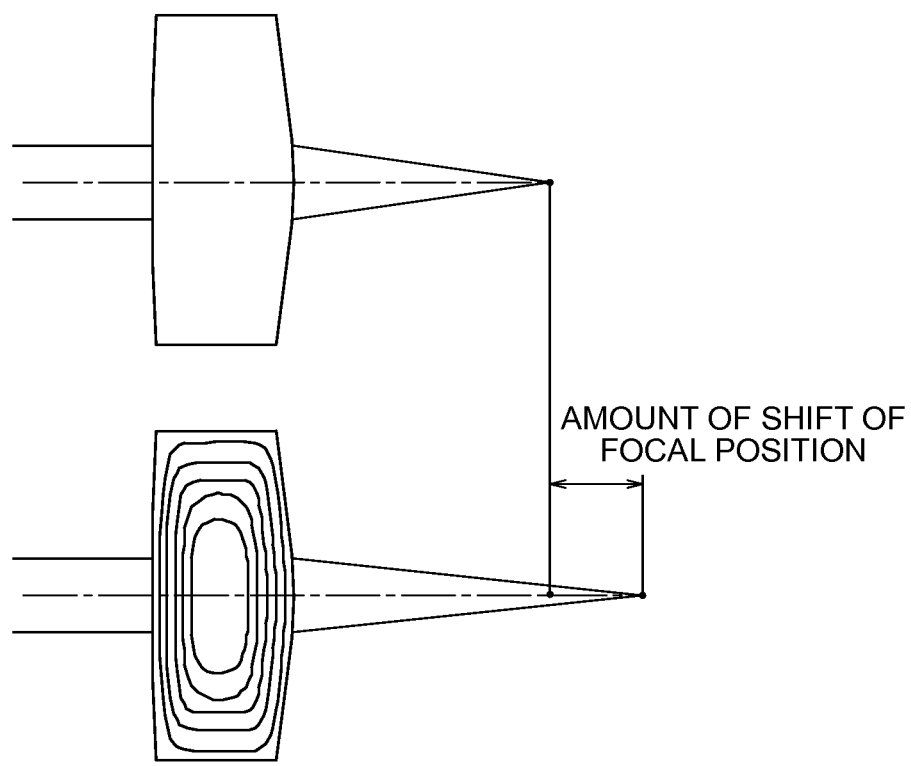
FIG. 2 illustrates a movement (shift) of the focal point in a cross-section perpendicular to the main scanning direction due to change in refractive index of the second scanner lens caused by moisture absorption.

FIG. 2 illustrates a movement (shift) of the focal point in a cross-section perpendicular to the main scanning direction due to change in refractive index of the second scanner lens 111b caused by moisture absorption. In FIG. 2, solid lines in the lens show equal values of refractive index. When humidity around the second scanner lens 111b rises, at first the outer regions of the lens absorb moisture and then inner portions gradually absorb moisture. Refractive index of a plastic material increases when the plastic material has absorbed moisture. As a result, refractive index varies in the optical axis direction of the second scanner lens 111b, and therefore the focal point moves.

Figure 3:
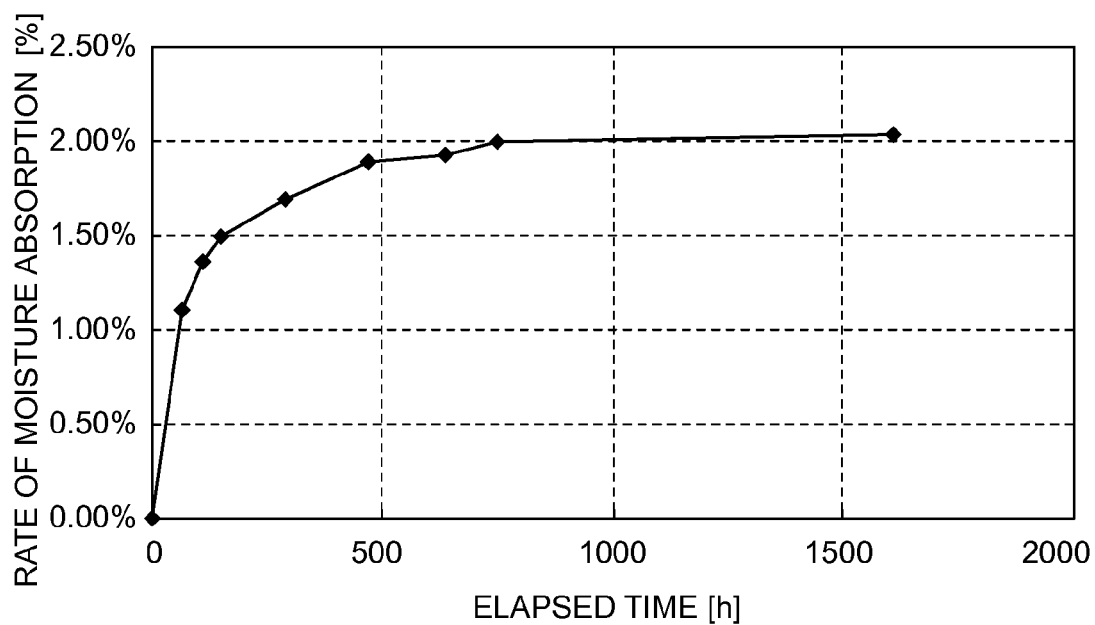
FIG. 3 shows a relationship between elapsed time and rate of moisture absorption.

FIG. 3 shows a relationship between elapsed time and rate of moisture absorption when a lens of PMMA is immersed in water at a temperature of 60° C. The horizontal axis of FIG. 3 shows elapsed time while the vertical axis of FIG. 3 shows a rate of moisture absorption. The rate of moisture absorption is defined by the following expression.

Rate of moisture absorption=(Weight of the lens which has absorbed moisture−Initial weight of the lens)·100/(Initial weight of the lens)(%)

As shown in FIG. 3, the rate of saturated moisture absorption is approximately 2%.

Figure 4:
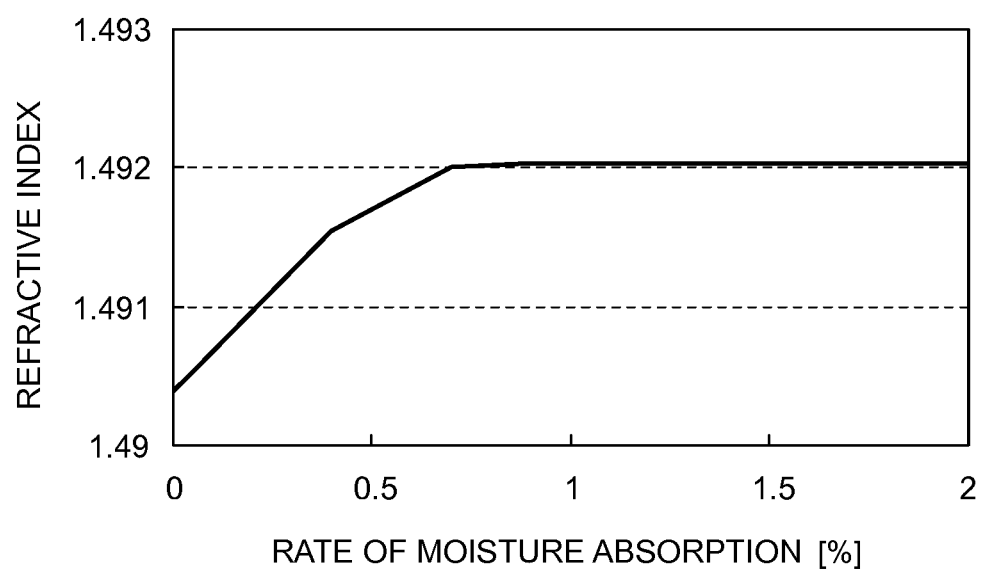
FIG. 4 shows a relationship between rate of moisture absorption and refractive index of PMMA.

FIG. 4 shows a relationship between rate of moisture absorption and refractive index of PMMA. The horizontal axis of FIG. 4 shows rate of moisture absorption while the vertical axis of FIG. 4 shows refractive index. As the rate of moisture absorption changes from 0 to approximately 2%, the refractive index changes from 1.4904 to 1.4920.

Figure 5:
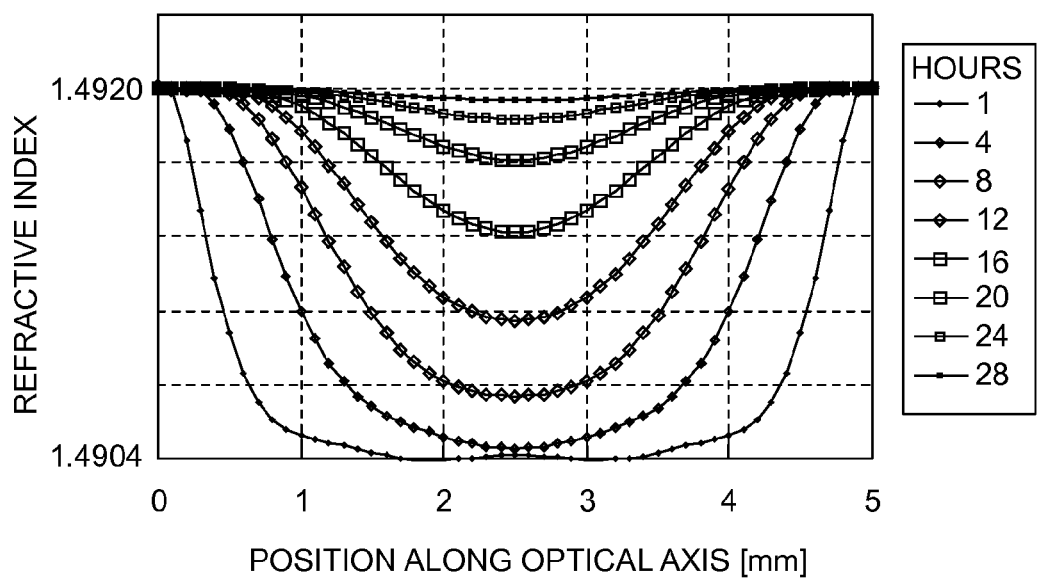
FIG. 5 shows temporal change in refractive index inside the lens due to moisture absorption.

FIG. 5 shows temporal change in refractive index inside the lens due to moisture absorption. The temporal change has been obtained using simulation. The horizontal axis of FIG. 5 shows position along the optical axis inside the lens while the vertical axis of FIG. 5 shows refractive index. In the initial stage, the outer regions alone of the lens show a higher refractive index. With the passage of time, the refractive index of the central region becomes higher while the refractive index of the outer regions remains unchanged. Ultimately, the refractive index of the central region becomes equal to that of the outer regions, and thereby the refractive index becomes uniform along the optical axis. Until the refractive index becomes uniform along the optical axis after moisture absorption has advanced, variation in refractive index along the optical axis continues to exist.

Figure 6:
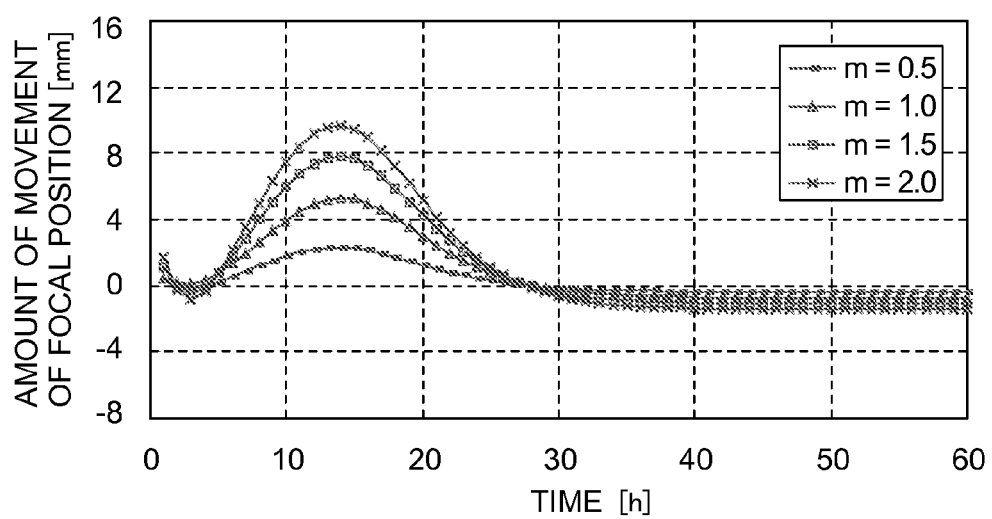
FIG. 6 shows temporal change in the focal position of the second scanner lens caused by temporal change in refractive index inside the second scanner lens due to moisture absorption.

FIG. 6 shows temporal change in the focal position of the second scanner lens caused by temporal change in refractive index inside the second scanner lens due to moisture absorption. The horizontal axis of FIG. 6 shows time while the vertical axis of FIG. 6 shows amount of movement of the focal position. The temporal change in the focal position shown in FIG. 6 corresponds to the temporal change in refractive index inside the second scanner lens due to moisture absorption shown in FIG. 5. The temporal change in the focal position has been obtained using optical simulation. The optical simulation was performed using optical design software Zemax. The shape of the cross section of the scanner lens shown in FIG. 1 is as below.

| Thickness in the optical axis direction t | 5 millimeters |
| Width in the vertical scanning direction h | 8 millimeters |
| Beam diameter a | 2 millimeters |

The amount of movement of the focal position varies depending on lateral magnification m. Lateral magnification will be described later.

With the passage of time, the focal position moves in such a direction that the focal length increases, and after a certain time period the focal length is maximized. The amount of movement of the focal position, which corresponds to the maximum focal length is called the maximum amount of movement of the focal position. Then, the focal length gradually decreases, and the focal position returns to the position which substantially corresponds to the initial focal length. The change in the focal position described above is caused by the temporal change in distribution of refractive index along the optical axis, which is shown in FIG. 5.

As to the shape of the cross section shown in FIG. 1, the maximum amount of movement of the focal position is obtained for various values of thickness in the optical axis direction t, width in the vertical scanning direction h, and lateral magnification, assuming that beam diameter a is constant.

Table 1 shows values of lateral magnification m, thickness in the optical axis direction t, beam diameter a, width in the vertical scanning direction h, allowance b and ratio of allowance b to thickness in the optical axis direction t, for 16 cases. The thickness in the optical axis direction t represents the maximum value of thickness among values of thickness in cross sections which are perpendicular to the main scanning direction and correspond to various positions along the main scanning direction.

TABLE 1

| No. | Lateral magnification m | Thickness in the optical axis direction t | Beam diameter a | Width in the vertical scanning direction h | Allowance b | b/t |
|---|---|---|---|---|---|---|
| 1 | 0.5 | 7 mm | 2 mm | 8 mm | 3 mm | 0.42857 |
| 2 | 0.5 | 5 mm | 2 mm | 8 mm | 3 mm | 0.6 |
| 3 | 0.5 | 7 mm | 2 mm | 12 mm | 5 mm | 0.71428 |
| 4 | 0.5 | 5 mm | 2 mm | 12 mm | 5 mm | 1 |
| 5 | 1 | 7 mm | 2 mm | 8 mm | 3 mm | 0.42857 |
| 6 | 1 | 5 mm | 2 mm | 8 mm | 3 mm | 0.6 |
| 7 | 1 | 7 mm | 2 mm | 12 mm | 5 mm | 0.71428 |
| 8 | 1 | 5 mm | 2 mm | 12 mm | 5 mm | 1 |
| 9 | 1.5 | 7 mm | 2 mm | 8 mm | 3 mm | 0.42857 |
| 10 | 1.5 | 5 mm | 2 mm | 8 mm | 3 mm | 0.6 |
| 11 | 1.5 | 7 mm | 2 mm | 12 mm | 5 mm | 0.71428 |
| 12 | 1.5 | 5 mm | 2 mm | 12 mm | 5 mm | 1 |
| 13 | 2 | 7 mm | 2 mm | 8 mm | 3 mm | 0.42857 |
| 14 | 2 | 5 mm | 2 mm | 8 mm | 3 mm | 0.6 |
| 15 | 2 | 7 mm | 2 mm | 12 mm | 5 mm | 0.71428 |
| 16 | 2 | 5 mm | 2 mm | 12 mm | 5 mm | 1 |

Figure 7:
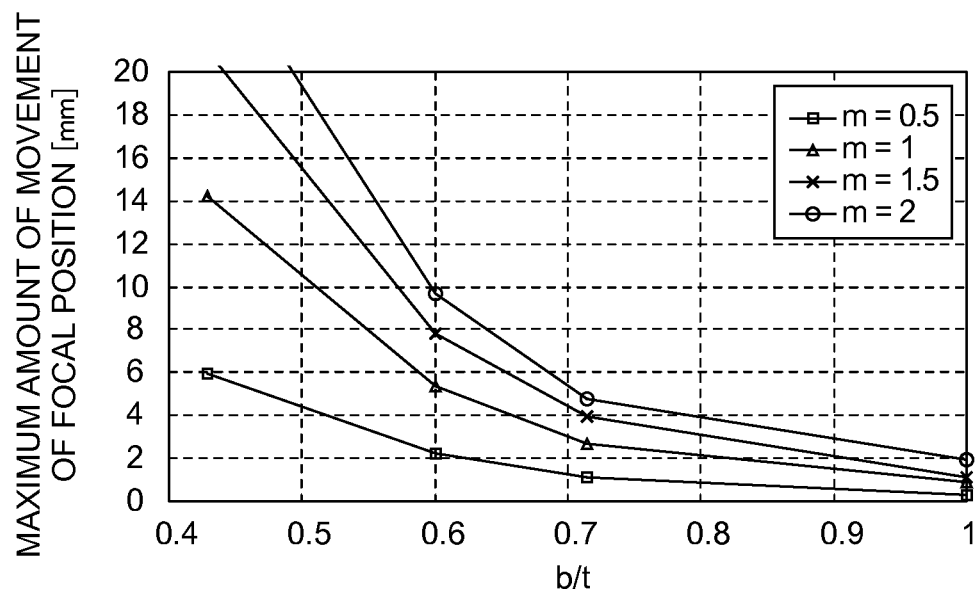
FIG. 7 shows relationships between ratio of allowance b to thickness in the optical axis direction t and the maximum amount of movement of the focal position for the 16 cases.

FIG. 7 shows relationships between ratio of allowance b to thickness in the optical axis direction t and the maximum amount of movement of the focal position for the 16 cases. The horizontal axis of FIG. 7 shows ratio of allowance b to thickness in the optical axis direction t, while the vertical axis of FIG. 7 shows the maximum amount of movement of the focal position. FIG. 7 makes it clear that the maximum amount of movement of the focal position can be expressed as a function of ratio of allowance b to thickness in the optical axis direction t and lateral magnification. The maximum amount of movement of the focal position decreases with increasing ratio of allowance b to thickness in the optical axis direction t, while the maximum amount of movement of the focal position increases with increasing lateral magnification.

Lateral magnification will be described below.

Figure 8:
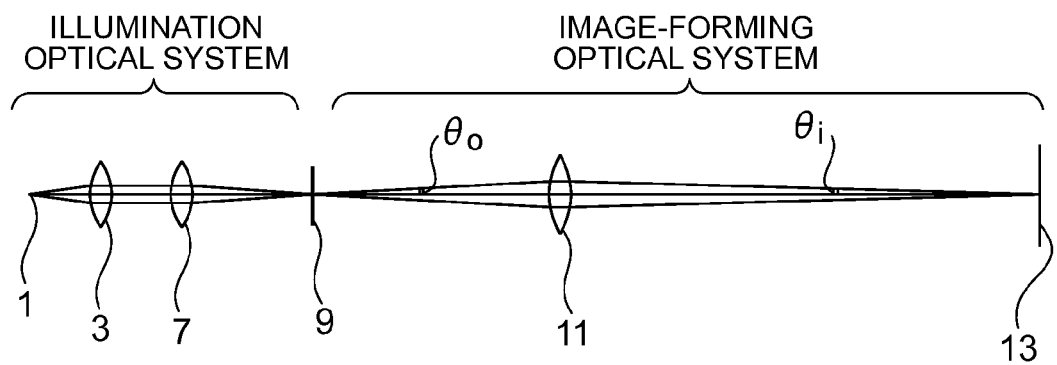
FIG. 8 shows a cross section of the optical scanning system, which contains the optical axis and is in the vertical scanning direction.

FIG. 8 shows a cross section of the optical scanning system, which contains the optical axis and is in the vertical (auxiliary) scanning direction. Light emitted by the laser diode light source 1 is collimated by the collimator lens 3, passes through the diaphragm which is not shown and the cylindrical lens 7, is reflected by the polygon mirror 9, passes through the scanner lens 11, and collected on the scanned surface 13. The single scanner lens in FIG. 8 can be replaced with plural lenses. In the cross section of the optical scanning system, which contains the optical axis and is in the vertical scanning direction, the point of reflection on the polygon mirror 9 and the point on the scanned surface 13 are made conjugate with each other so as to reduce optical face tangle error of the polygon mirror 9. Lateral magnification r can be expressed by the following expression when half angle of visual angle for the effective aperture of the scanner lens 11 at the point of reflection on the polygon mirror 9 is represented as θo and half angle of visual angle for the effective aperture of the scanner lens 11 at the point on the scanned surface 13 is represented as θi.

$r = \sin\theta o / \sin\theta i$

That is, lateral magnification is a ratio of numerical aperture (NA) on the object point side to numerical aperture (NA) on the image point side.

Figure 9A:
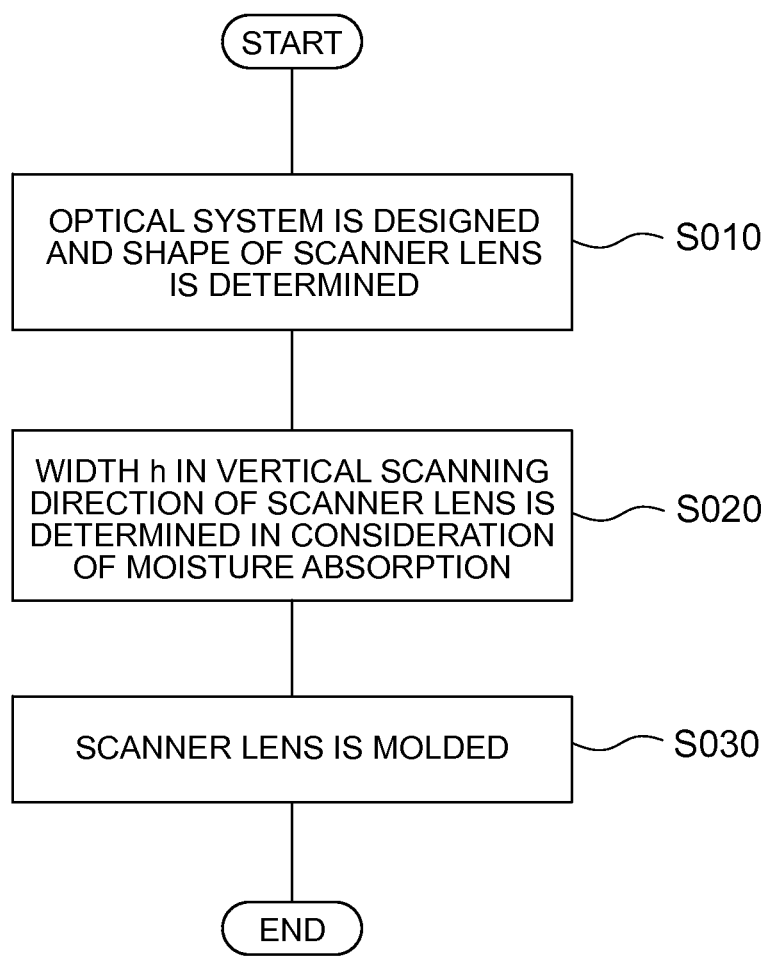
FIG. 9A is a flowchart showing a method for producing a scanner lens according to an embodiment of the present invention.

FIG. 9A is a flowchart showing a method for producing a scanner lens according to an embodiment of the present invention.

In step S010 of FIG. 9A, an optical scanning system is designed and a shape of the scanner lens is determined. Specifications of the optical scanning system and shapes of the scanner lens will be described later as examples.

In step S020 of FIG. 9A, width in the vertical scanning direction of the scanner lens is determined in consideration of moisture absorption of the scanner lens.

Figure 9B:
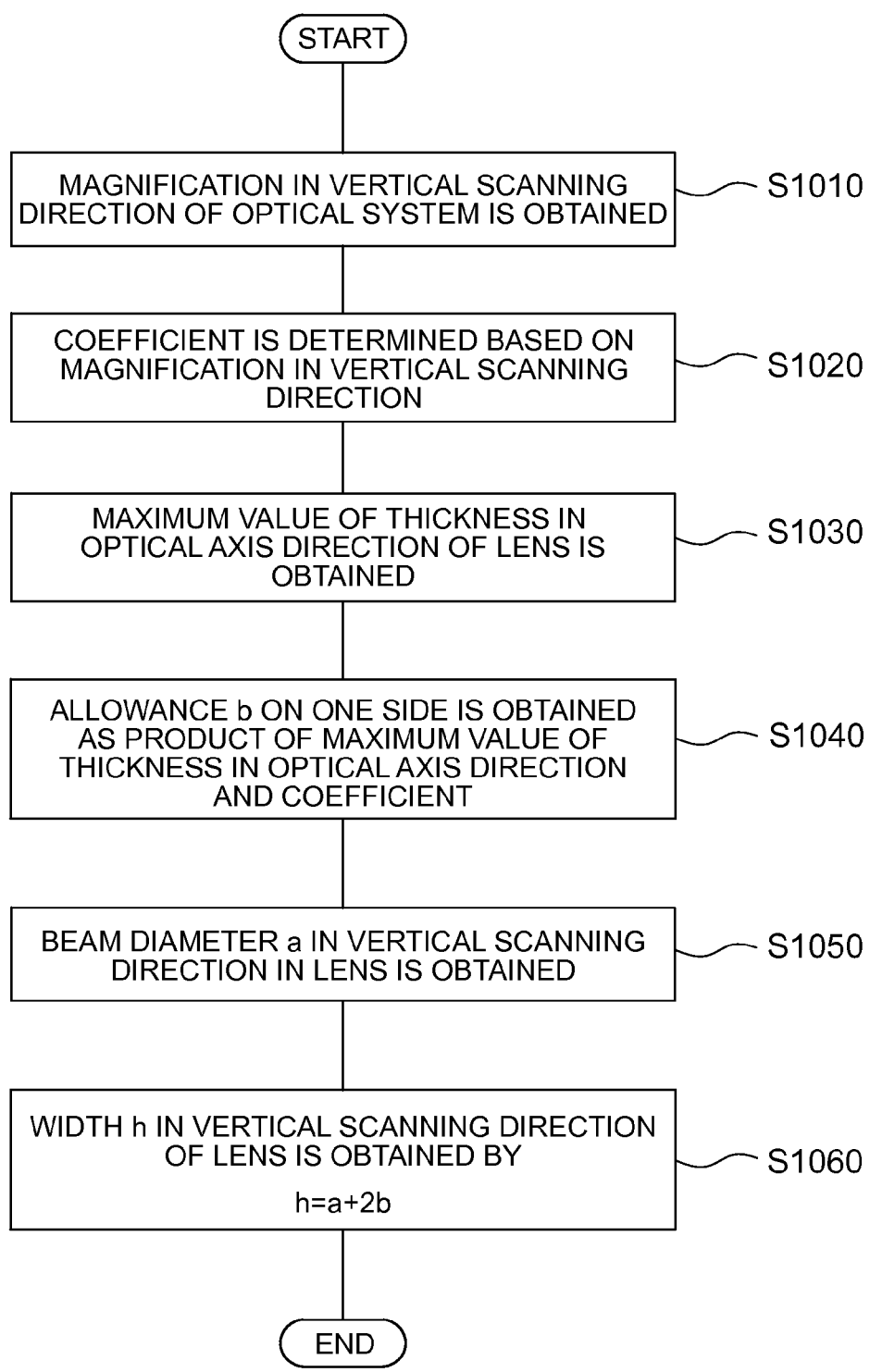
FIG. 9B is a flowchart showing a method for determining width in the vertical scanning direction of the scanner lens in consideration of moisture absorption of the scanner lens.

FIG. 9B is a flowchart showing a method for determining width in the vertical scanning direction of the scanner lens in consideration of moisture absorption of the scanner lens.

In step S1010 of FIG. 9B, lateral magnification of the optical scanning system is obtained.

In step S1020 of FIG. 9B, a coefficient for determining allowance b is obtained based on the lateral magnification. How to obtain the coefficient will be described later.

In step S1030 of FIG. 9B, the maximum value of thickness in the optical axis direction of the scanner lens is obtained. The maximum value of thickness in the optical axis direction is defined as the maximum value of thickness among values of thickness in cross sections which are perpendicular to the main scanning direction and correspond to various positions along the main scanning direction.

In step S1040 of FIG. 9B, allowance b on one side is obtained as a product of the maximum value of thickness in the optical axis direction and the coefficient.

In step S1050 of FIG. 9B, beam diameter a in the vertical scanning direction in the scanner lens is obtained.

In step S1060 of FIG. 9B, width h in the vertical scanning direction of the scanner lens is obtained by the following expression.

$$h = a + 2b \quad (1)$$

As shown in FIG. 1, a represents beam diameter in the vertical scanning direction and b represents an allowance of width on one side in the vertical scanning direction.

In step S030 of FIG. 9A, the scanner lens is molded. For example, the scanner lens is injection-molded.

Figure 10:
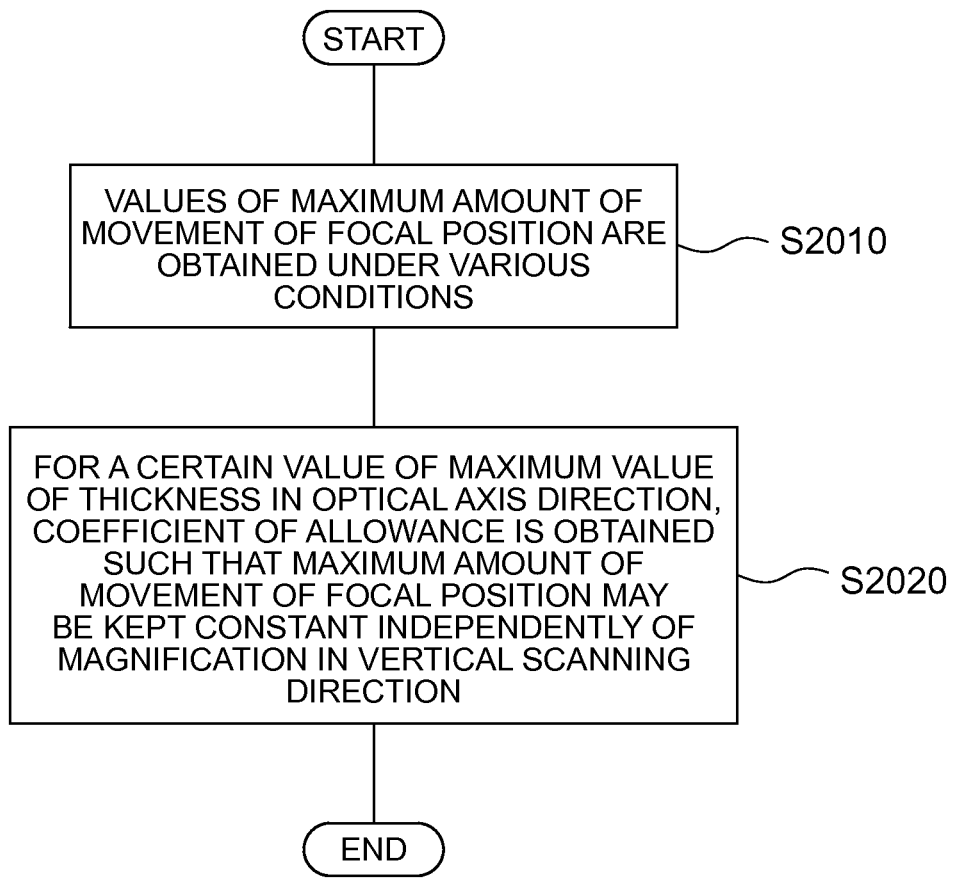
FIG. 10 is a flowchart showing a method for obtaining a coefficient for determining allowance b based on the lateral magnification.

FIG. 10 is a flowchart showing a method for obtaining a coefficient for determining allowance b based on the lateral magnification. That is, FIG. 10 is a flowchart illustrating step S1020 of FIG. 9B in detail.

In step S2010 of FIG. 10, values of the maximum amount of movement of the focal position are obtained under various conditions. More specifically, values of the maximum amount of movement of the focal position shown in FIG. 7 are obtained under the conditions shown in Table 1. The values of the maximum amount of movement of the focal position may be obtained using simulation or experimentally.

In step S2020 of FIG. 10, for a certain value of the maximum value of thickness t in the optical axis direction, allowance b in the expression described below is determined in such a way that the maximum amount of movement of the focal position may be kept constant independently of the lateral magnification m.

$$h = a + 2b \quad (1)$$

h represents width in the vertical scanning direction of the scanner lens, a represents beam diameter in the vertical scanning direction and b represents an allowance of width on one side in the vertical scanning direction.

More specifically, a function $\alpha(m)$ of lateral magnification m is determined by the following expression, for example.

$$\alpha(m) = 30 \cdot m^{1/100} - 29 \quad (2)$$

Figure 11:
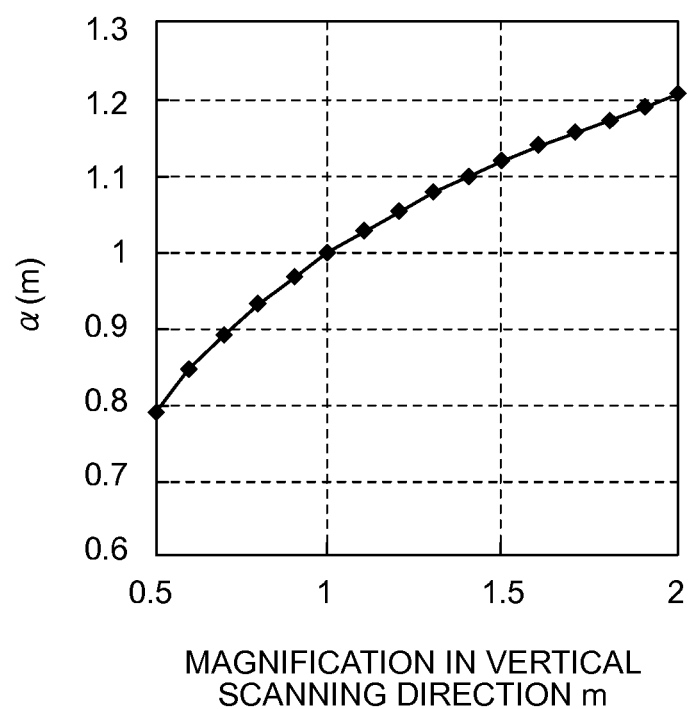
FIG. 11 shows a relationship between lateral magnification m and α(m) in Expression (2)

FIG. 11 shows a relationship between lateral magnification m and $\alpha(m)$ in Expression (2).

In general, the coefficient $\alpha(m)$ can be determined in the form of expression including lateral magnification m. The expression is not limited to Expression (2) and can be any expression that determines allowance b in such a way that the maximum amount of movement of the focal position may be kept constant independently of the lateral magnification m. Alternatively, the coefficient $\alpha(m)$ can be determined in the form of tables which contains values of the coefficient for respective values of lateral magnification m.

Figure 12:
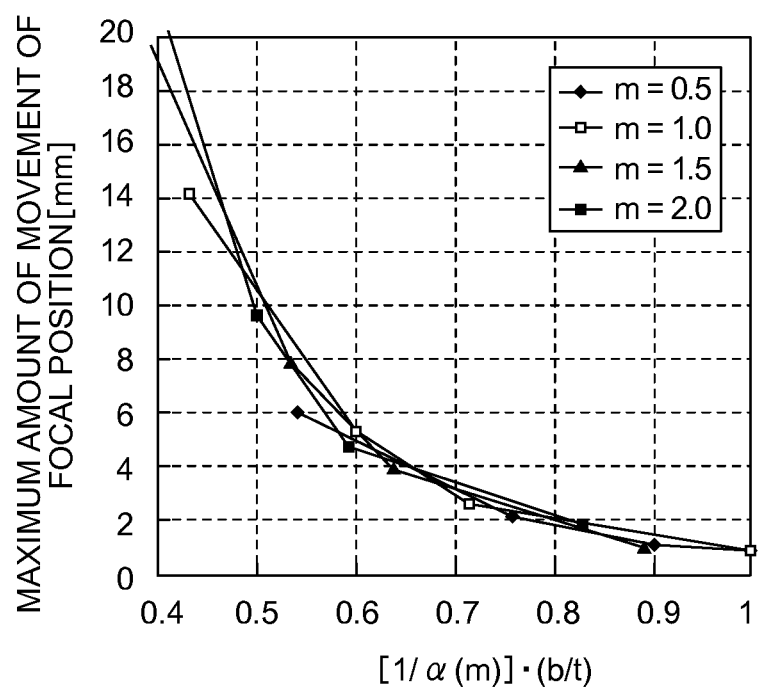
FIG. 12 shows various shapes around the bottom of the hollow of an optical element.

FIG. 12 shows a relationship between $[1/\alpha(m)] \cdot (b/t)$ and the maximum amount of movement of the focal position. $\alpha(m)$ is defined by Expression (2). Further, t represents the maximum value of thickness in the optical axis direction. As shown in FIG. 12, the maximum amount of movement of the focal position is a function of $[1/\alpha(m)] \cdot (b/t)$. Thus, a value of the maximum amount of movement of the focal position varies depending on a value of $[1/\alpha(m)] \cdot (b/t)$ while remains substantially unchanged when a value of lateral magnification m varies between 0.5 and 2.0. That is, the maximum amount of movement of the focal position is kept substantially constant independently of lateral magnification m.

Accordingly, if the allowance b in Expression (1) is determined as described below, the maximum amount of movement of the focal position can be kept substantially constant independently of lateral magnification m as shown in FIG. 12. The maximum amount of movement of the focal position is the value which corresponds to the maximum amount of movement while the rate of moisture absorption increases for 0 to the maximum (saturated) value. In general, if the maximum amount of movement is less than an allowable upper limit, there will arise no problem in optical performance. The allowable upper limit of the maximum amount of movement ranges from 2 millimeters to 4 millimeters depending on applications. According to FIG. 11, $\alpha(m) = 1$ holds when $m = 1$. Then, for example, if a value of $[1/\alpha(m)] \cdot (b/t) = (b_0/t)$ is set to 0.7 or more when $m = 1$, the maximum amount of movement is 4 millimeters or less as shown in FIG. 12. $b_0$ represents allowance when $m = 1$. Accordingly, allowance b should be determined by the following expression in order to make the maximum amount of movement of the focal point smaller than or equal to 4 millimeters.

$$b = \alpha(m) \cdot b_0 \quad (3)$$

$$b_0 = 0.7 \cdot t \quad (4)$$

Thus, allowance b can be expressed as a product of the maximum value t of thickness in the optical axis direction and a coefficient $(0.7 \cdot \alpha(m))$. The coefficient is determined according to lateral magnification m.

More generally, if $\alpha(m)$ is determined in such a way that it appropriately increases with lateral magnification m, increase in the maximum amount of movement of the focal position can be moderated.

Examples of the optical scanning system will be described below.

Example 1

FIG. 13A is a cross-sectional view of the scanning optical system of Example 1. The cross section is in the main scanning direction and contains the optical axis. Light emitted by the laser diode light source 101 is collimated by the collimator lens 103, passes through the diaphragm 105 and the cylindrical lens 107, is reflected by the polygon mirror 109, passes through the first scanner lens 111a and the second scanner lens 111b, and collected on the scanned surface 113. The first scanner lens 111a is made of polyolefin resin while the second scanner lens 111b is made of poly-methyl methacrylate resin.

The surface on the polygon mirror side of the first scanner lens 111a, the surface on the scanned surface side of the first scanner lens 111a, the surface on the polygon mirror side of the second scanner lens 111b, and the surface on the scanned surface side of the second scanner lens 111b are defined as a first surface, a second surface, a third surface and a fourth surface, respectively.

Definitions of symbols used in Example 1 and the succeeding examples are as below.

t1: center thickness of the first scanner lens 111a [millimeters]
t2: center thickness of the second scanner lens 111b [millimeters]
n1: refractive index of the first scanner lens 111a
n2: refractive index of the second scanner lens 111b
d1: distance from the point of reflection on the polygon to the first surface [millimeters]
d2: distance from the point of reflection on the polygon to the third surface [millimeters]
L: whole length (distance from the point of reflection on the polygon to the scanned surface) [millimeters]
F: focal length of the whole optical system [millimeters]

DEFINITIONS OF SYMBOLS USED IN THE EXPRESSION ARE AS BELOW y: coordinate in the main scanning direction
x: coordinate in the vertical scanning direction
z: sag
k: conic constant
Ry: radius of curvature in the cross section in the main scanning direction
rx(y) radius of curvature at coordinate y in the main scanning direction in the cross section in the vertical scanning direction
rx(0) radius of curvature on the optical axis in the cross section in the vertical scanning direction
Ai: aspheric coefficients in the cross section in the main scanning direction (i=1, 2, 3, 4 . . . )
Bi: coefficients for determining radius of curvature in the cross section in the vertical scanning direction (i=1, 2, 3, 4 . . . )

Table 2 shows values of constants and coefficients of the first to fourth surfaces.

TABLE 2

| Type of surface | First surface Toric surface | Second surface Toric surface | Third surface Toric surface | Fourth surface Toric surface |
|---|---|---|---|---|
| Ry | −112.701 | −52.894 | −661.614 | 1384.024 |
| k | 2.697 | −0.982 | 6.237 | −3.071 |
| A3 | 0 | 0 | 0 | 0 |
| A4 | 1.799E−06 | 2.951E−07 | 7.060E−08 | −8.155E−08 |
| A5 | 0 | 0 | 0 | 0 |
| A6 | −7.360E−10 | 7.309E−11 | −1.936E−12 | 4.735E−12 |
| A7 | 0 | 0 | 0 | 0 |
| A8 | 1.384E−13 | −1.807E−13 | −1.261E−16 | −2.975E−16 |
| A9 | 0 | 0 | 0 | 0 |
| A10 | 0 | 0 | 3.898E−21 | 4.164E−21 |
| rx(0) | Infinity | Infinity | 70.939 | −38.344 |
| B1 | 0 | 0 | 0 | 2.080E−03 |
| B2 | 0 | 0 | 3.791E−03 | −7.784E−04 |
| B3 | 0 | 0 | 0 | 1.186E−07 |
| B4 | 0 | 0 | −2.100E−07 | 8.636E−09 |
| B5 | 0 | 0 | 0 | 0 |
| B6 | 0 | 0 | 0 | 0 |

Values for symbols are as below.
t1: 12.5 mm
t2: 4.5 mm
n1: 1.504
n2: 1.486
d1: 29.2 mm
d2: 158.9 mm
L: 240 mm
f: 200 mm The first to fourth surfaces are defined by the following expression in Example 1 as well as in the succeeding examples.

$$z = \frac{\frac{y^2}{R_y}}{1+\sqrt{1-(1+k)\frac{y^2}{R_y^2}}} + \sum_{i=1}^{N} A_i y^i + \frac{\frac{x^2}{r_x(y)}}{1+\sqrt{1-\frac{x^2}{r_x(y)^2}}}$$

where $$r_x(y) = r_x(0) + \sum_{i=1}^{N} B_i y^i$$

Figure 13B:
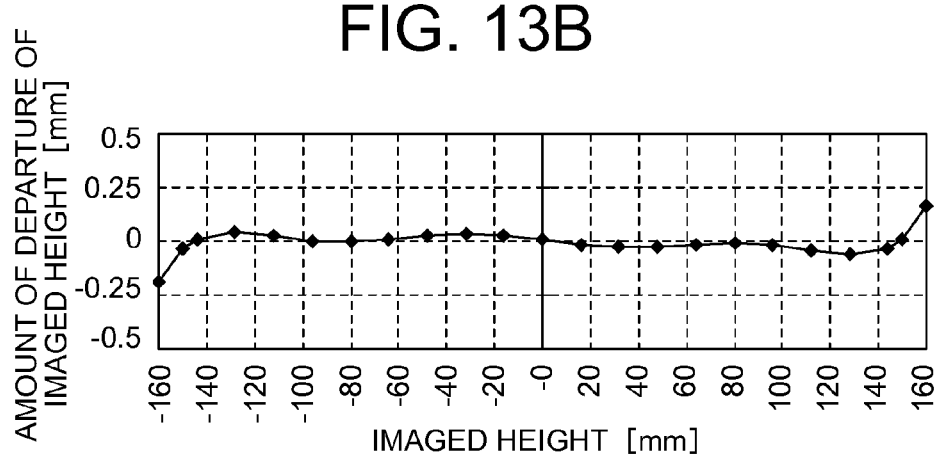
FIG. 13B shows a relationship between imaged height and an amount of departure of imaged height in the scanning optical system of Example 1.

FIG. 13B shows a relationship between imaged height and an amount of departure of imaged height in the scanning optical system of Example 1. The horizontal axis of FIG. 13B represents imaged height while the vertical axis represents an amount of departure of imaged height. When theoretical imaged height on the scanned surface is represented as Y [millimeters], deflection angle is represented as θ [degrees] and distance is represented as f [millimeters], the following expression holds.

$Y = f\theta$

The amount of departure of imaged height is an amount of departure of the actual imaged height from the theoretical imaged height.

Figure 13C:
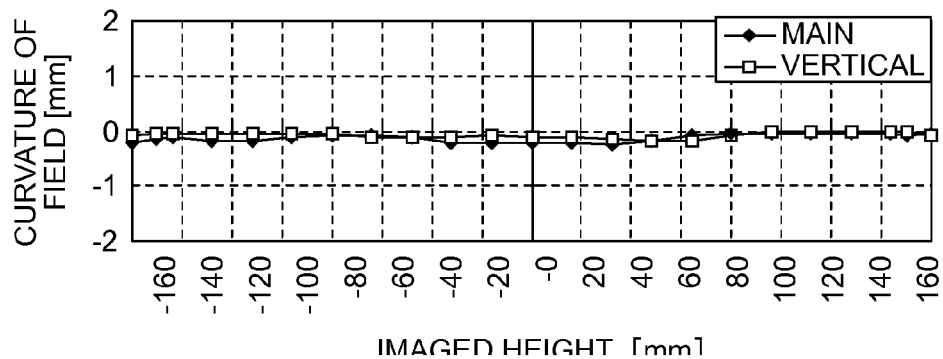
FIG. 13C shows a relationship between imaged height and curvature of field in the scanning optical system of Example 1.

FIG. 13C shows a relationship between imaged height and curvature of field in the scanning optical system of Example 1. The horizontal axis of FIG. 13C represents imaged height while the vertical axis represents curvature of field. In FIG. 13C, "main" and "vertical" represent the main scanning direction and the vertical scanning direction, respectively.

The maximum value of thickness t in the optical axis direction of the second scanner lens 111b is 7.09 millimeters. Since lateral magnification m is 0.5, α(m) is 0.79 according to FIG. 11. Beam diameter a in the vertical scanning direction is 1.8 millimeters. When ($b_0$/t) is set to 0.7, width h in the vertical scanning direction of the second scanner lens 111b is obtained as below according to Expressions (1) and (3).

$$h = a + 2 \cdot \alpha(m) \cdot (b_0/t) \cdot t$$
$$= a + 2 \cdot 0.79 \cdot 0.7 \cdot 7.09$$
$$= a + 7.84$$
$$= 9.64 \text{ (millimeters)}$$

Example 2

Figure 14A:
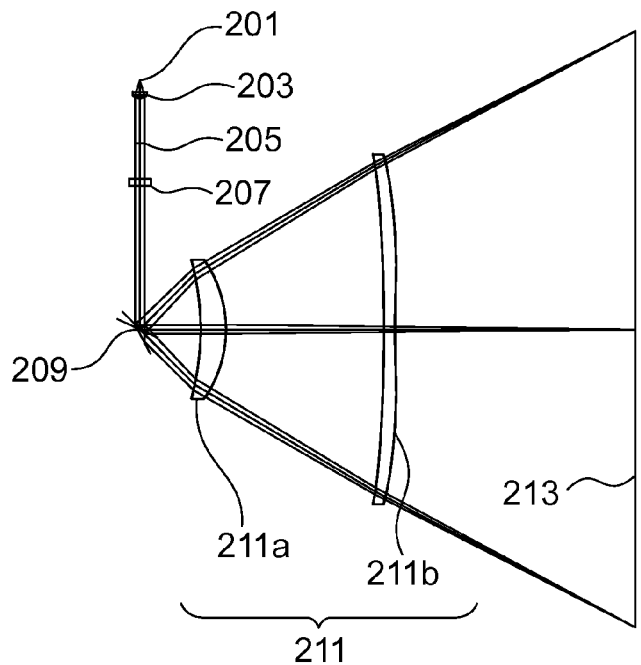
FIG. 14A is a cross-sectional view of the scanning optical system of Example 2.

FIG. 14A is a cross-sectional view of the scanning optical system of Example 2. The cross section is in the main scanning direction and contains the optical axis. Light emitted by a laser diode light source 201 is collimated by a collimator lens 203, passes through a diaphragm 205 and a cylindrical lens 207, is reflected by a polygon mirror 209, passes through a first scanner lens 211a and a second scanner lens 211b, and collected on a scanned surface 213. The first scanner lens 211a is made of polyolefine resin while the second scanner lens 211b is made of poly-methyl methacrylate resin.

The surface on the polygon mirror side of the first scanner lens 211a, the surface on the scanned surface side of the first scanner lens 211a, the surface on the polygon mirror side of the second scanner lens 211b, and the surface on the scanned surface side of the second scanner lens 211b are defined as a first surface, a second surface, a third surface and a fourth surface, respectively.

Values for symbols are as below.
t1: 12 mm
t2: 4.8 mm
n1: 1.504
n2: 1.486
d1: 29 mm
d2: 119 mm
L: 240 mm
f: 200 mm Table 3 shows values of constants and coefficients of the first to fourth surfaces.

TABLE 3

| Type of surface | First surface Toric surface | Second surface Toric surface | Third surface Toric surface | Fourth surface Toric surface |
|---|---|---|---|---|
| R | −93.435 | −47.617 | −566.245 | 1968.977 |
| K | 1.160 | −1.007 | −8.527 | 9.227 |
| A3 | 0 | 0 | 0 | 0 |
| A4 | 2.018E−06 | 3.982E−07 | 6.305E−08 | −1.891E−07 |
| A5 | 0 | 0 | 0 | 0 |
| A6 | −5.157E−10 | 2.967E−10 | −8.543E−12 | 1.107E−11 |
| A7 | 0 | 0 | 0 | 0 |
| A8 | 6.219E−14 | −1.766E−13 | 2.425E−16 | −8.749E−16 |
| A9 | 0 | 0 | 0 | 0 |
| A10 | 0 | 0 | 2.326E−21 | 2.799E−20 |
| Rx | Infinity | Infinity | 98.827 | −39.398 |
| B1 | 0 | 0 | 0 | 4.216E−03 |
| B2 | 0 | 0 | 1.579E−02 | −7.113E−04 |
| B3 | 0 | 0 | 0 | 2.634E−08 |
| B4 | 0 | 0 | −4.265E−07 | 6.997E−08 |
| B5 | 0 | 0 | 0 | 0 |
| B6 | 0 | 0 | 0 | 0 |

Figure 14B:
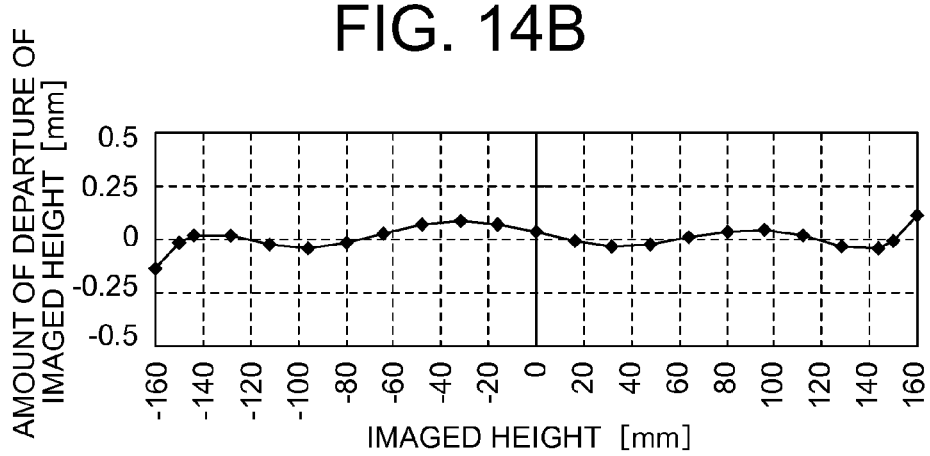
FIG. 14B shows a relationship between imaged height and an amount of departure of imaged height in the scanning optical system of Example 2.

FIG. 14B shows a relationship between imaged height and an amount of departure of imaged height in the scanning optical system of Example 2. The horizontal axis of FIG. 14B represents imaged height while the vertical axis represents an amount of departure of imaged height. When theoretical imaged height on the scanned surface is represented as Y [millimeters], deflection angle is represented as θ [degrees] and distance is represented as f [millimeters], the following expression holds.

$$Y = f \cdot \theta$$

The amount of departure of imaged height is an amount of departure of the actual imaged height from the theoretical imaged height.

Figure 14C:
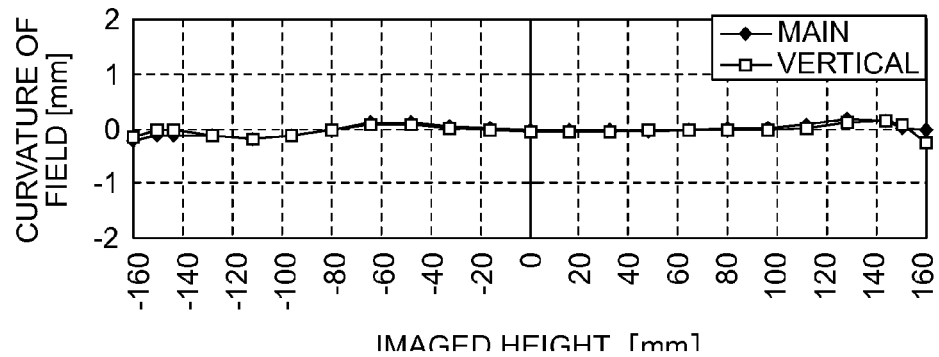
FIG. 14C shows a relationship between imaged height and curvature of field in the scanning optical system of Example 2.

FIG. 14C shows a relationship between imaged height and curvature of field in the scanning optical system of Example 2. The horizontal axis of FIG. 14C represents imaged height while the vertical axis represents curvature of field. In FIG. 14C, "main" and "vertical" represent the main scanning direction and the vertical scanning direction, respectively.

The maximum value of thickness t in the optical axis direction of the second scanner lens 211b is 6.34 millimeters. Since lateral magnification m is 1.0, α(m) is 1 according to FIG. 11. Beam diameter a in the vertical scanning direction is 2.7 millimeters. When ($b_0$/t) is set to 0.7, width h in the vertical scanning direction of the second scanner lens 211b is obtained as below according to Expressions (1) and (3).

$$h = a + 2 \cdot \alpha(m) \cdot (b_0/t) \cdot t$$
$$= a + 2 \cdot 1 \cdot 0.7 \cdot 6.34$$
$$= a + 8.88$$
$$= 11.58 \text{ (millimeters)}$$

Example 3

Figure 15A:
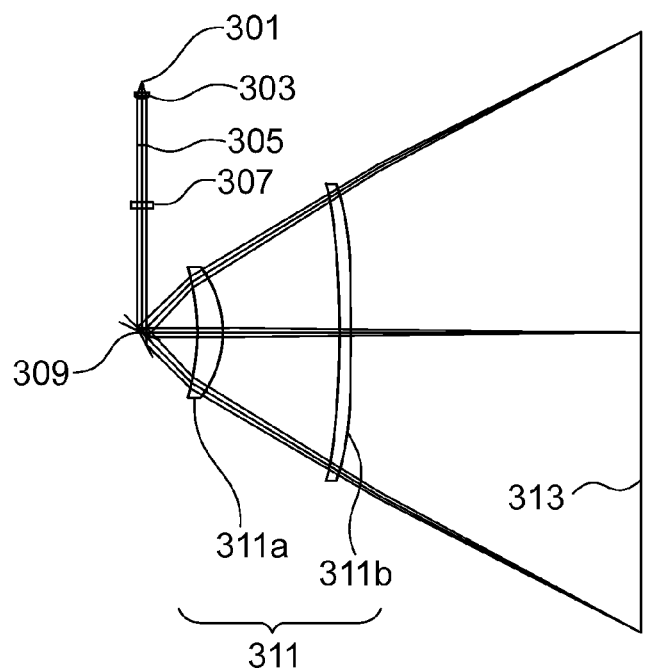
FIG. 15A is a cross-sectional view of the scanning optical system of Example 3.

FIG. 15A is a cross-sectional view of the scanning optical system of Example 3. The cross section is in the main scanning direction and contains the optical axis. Light emitted by a laser diode light source 301 is collimated by a collimator lens 303, passes through a diaphragm 305 and a cylindrical lens 307, is reflected by a polygon mirror 309, passes through a first scanner lens 311a and a second scanner lens 311b, and collected on a scanned surface 313. The first scanner lens 311a is made of polyolefine resin while the second scanner lens 311b is made of poly-methyl methacrylate resin.

The surface on the polygon mirror side of the first scanner lens 311a, the surface on the scanned surface side of the first scanner lens 311a, the surface on the polygon mirror side of the second scanner lens 311b, and the surface on the scanned surface side of the second scanner lens 311b are defined as a first surface, a second surface, a third surface and a fourth surface, respectively.

Values for symbols are as below.
t1: 12 mm
t2: 5 mm
n1: 1.504
n2: 1.486
d1: 27.288 mm
d2: 95.64 mm
L: 240 mm
f: 200 mm Table 4 shows values of constants and coefficients of the first to fourth surfaces.

TABLE 4

| Type of surface | First surface<br>Toric surface | Second surface<br>Toric surface | Third surface<br>Toric surface | Fourth surface<br>Toric surface |
|---|---|---|---|---|
| R | −73.978 | −41.669 | −368.648 | 889970.700 |
| k | 0.955 | −0.948 | 3.632 | −9.656 |
| A3 | 0 | 0 | 0 | 0 |
| A4 | 1.937E−06 | 1.691E−07 | 7.585E−08 | −3.708E−07 |
| A5 | 0 | 0 | 0 | 0 |
| A6 | −3.004E−10 | 3.757E−10 | −9.414E−12 | 3.608E−11 |
| A7 | 0 | 0 | 0 | 0 |
| A8 | 2.962E−14 | −2.311E−13 | 5.950E−16 | −3.490E−15 |
| A9 | 0 | 0 | 0 | 0 |
| A10 | 0 | 0 | 1.402E−20 | 1.770E−19 |
| rx | Infinity | Infinity | 67.544 | −44.846 |
| B1 | 0 | 0 | 0 | 9.216E−03 |
| B2 | 0 | 0 | 1.640E−02 | 1.295E−03 |
| B3 | 0 | 0 | 0 | −4.789E−07 |
| B4 | 0 | 0 | 1.488E−06 | −2.800E−08 |
| B5 | 0 | 0 | 0 | 0 |
| B6 | 0 | 0 | 0 | 0 |

Figure 15B:
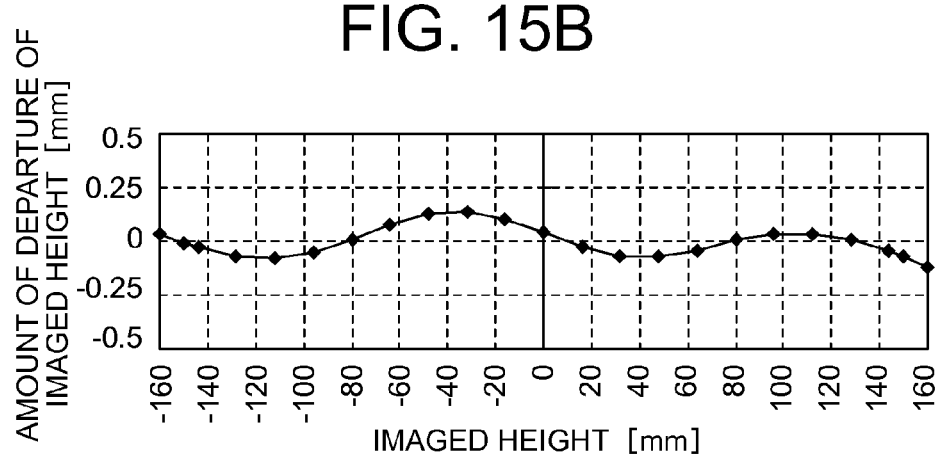
FIG. 15B shows a relationship between imaged height and an amount of departure of imaged height in the scanning optical system of Example 3.

FIG. 15B shows a relationship between imaged height and an amount of departure of imaged height in the scanning optical system of Example 3. The horizontal axis of FIG. 15B represents imaged height while the vertical axis represents an amount of departure of imaged height. When theoretical imaged height on the scanned surface is represented as Y [millimeters], deflection angle is represented as θ [degrees] and distance is represented as f [millimeters], the following expression holds.

$$Y = f \cdot \theta$$

The amount of departure of imaged height is an amount of departure of the actual imaged height from the theoretical imaged height.

Figure 15C:
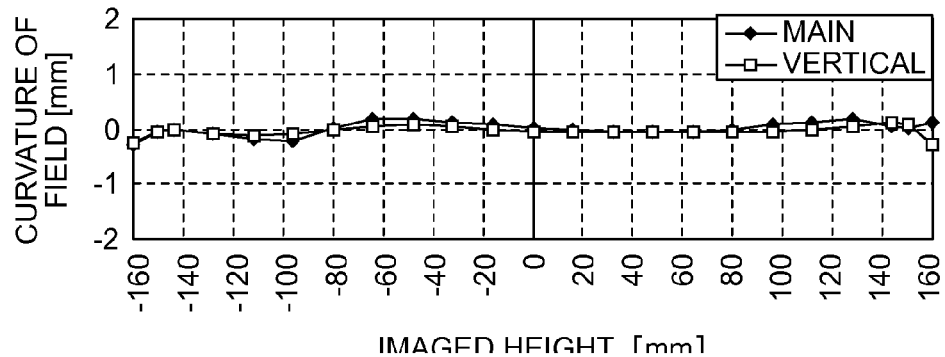
FIG. 15C shows a relationship between imaged height and curvature of field in the scanning optical system of Example 3.

FIG. 15C shows a relationship between imaged height and curvature of field in the scanning optical system of Example 3. The horizontal axis of FIG. 15C represents imaged height while the vertical axis represents curvature of field. In FIG. 15C, "main" and "vertical" represent the main scanning direction and the vertical scanning direction, respectively.

The maximum value of thickness t in the optical axis direction of the second scanner lens 311b is 6.28 millimeters. Since lateral magnification m is 1.5, α(m) is 1.12 according to FIG. 11. Beam diameter a in the vertical scanning direction is 3 millimeters. When $(b_0/t)$ is set to 0.7, width h in the vertical scanning direction of the second scanner lens 311b is obtained as below according to Expressions (1) and (3).

$$h = a + 2 \cdot \alpha(m) \cdot (b_0/t) \cdot t$$
$$= a + 2 \cdot 1.12 \cdot 0.7 \cdot 6.28$$
$$= a + 9.85$$
$$= 12.85 \text{ (millimeters)}$$

Example 4

Figure 16A:
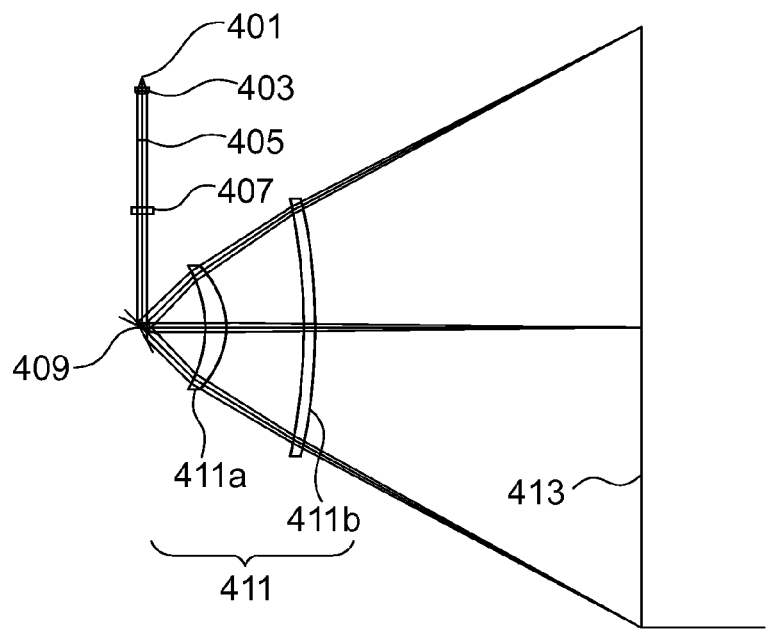
FIG. 16A is a cross-sectional view of the scanning optical system of Example 4.

FIG. 16A is a cross-sectional view of the scanning optical system of Example 4. The cross section is in the main scanning direction and contains the optical axis. Light emitted by a laser diode light source 401 is collimated by a collimator lens 403, passes through a diaphragm 405 and a cylindrical lens 407, is reflected by a polygon mirror 409, passes through a first scanner lens 411a and a second scanner lens 411b, and collected on the scanned surface 413. The first scanner lens 411a is made of polyolefine resin while the second scanner lens 411b is made of poly-methyl methacrylate resin.

The surface on the polygon mirror side of the first scanner lens 411a, the surface on the scanned surface side of the first scanner lens 411a, the surface on the polygon mirror side of the second scanner lens 411b, and the surface on the scanned surface side of the second scanner lens 411b are defined as a first surface, a second surface, a third surface and a fourth surface, respectively.

Values for symbols are as below.
t1: 10 mm
t2: 4 mm
n1: 1.504
n2: 1.486
d1: 31.085 mm
d2: 78.767 mm
L: 240 mm
f: 200 mm Table 5 shows values of constants and coefficients of the first to fourth surfaces.

TABLE 5

| Type of surface | First surface Toric surface | Second surface Toric surface | Third surface Toric surface | Fourth surface Toric surface |
|---|---|---|---|---|
| R | −52.312 | −32.049 | −124.416 | −391.913 |
| k | 0.297 | −0.936 | −13.649 | 5.438 |
| A3 | 0 | 0 | 0 | 0 |
| A4 | 2.017E−06 | 3.155E−07 | 2.740E−07 | −3.640E−07 |
| A5 | 0 | 0 | 0 | 0 |
| A6 | 9.611E−10 | 5.268E−10 | −2.022E−11 | 6.043E−11 |
| A7 | 0 | 0 | 0 | 0 |
| A8 | 2.653E−13 | 5.851E−13 | −7.157E−16 | −4.766E−15 |
| A9 | 0 | 0 | 0 | 0 |
| A10 | 0 | 0 | 6.543E−20 | 2.697E−20 |
| rx | Infinity | Infinity | 206.789 | −28.718 |
| B1 | 0 | 0 | −1.776E−02 | 5.568E−03 |
| B2 | 0 | 0 | 1.151E−01 | −9.220E−04 |
| B3 | 0 | 0 | 7.471E−05 | 7.863E−07 |
| B4 | 0 | 0 | −1.763E−05 | 1.166E−08 |
| B5 | 0 | 0 | 0 | 0 |
| B6 | 0 | 0 | 0 | 0 |

Figure 16B:
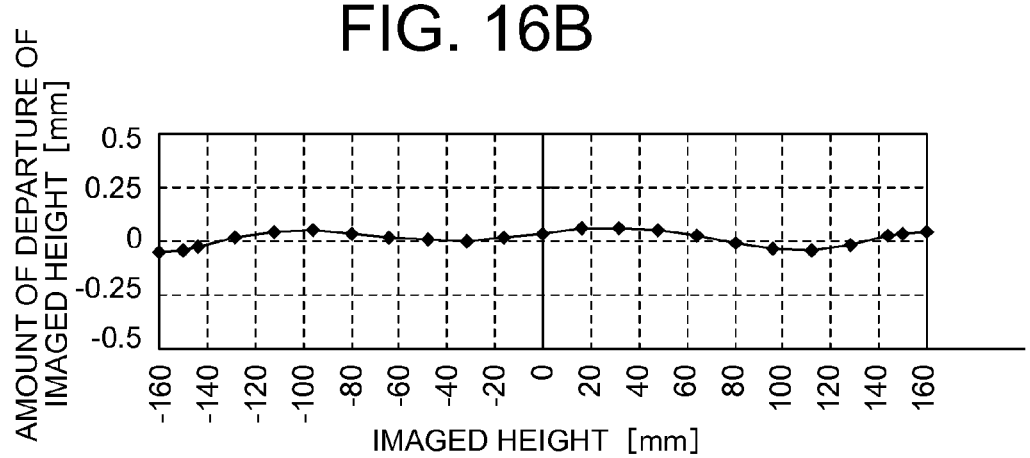
FIG. 16B shows a relationship between imaged height and an amount of departure of imaged height in the scanning optical system of Example 4.

FIG. 16B shows a relationship between imaged height and an amount of departure of imaged height in the scanning optical system of Example 4. The horizontal axis of FIG. 16B represents imaged height while the vertical axis represents an amount of departure of imaged height. When theoretical imaged height on the scanned surface is represented as Y [millimeters], deflection angle is represented as θ [degrees] and distance is represented as f [millimeters], the following expression holds.

$$Y = f \cdot \theta$$

The amount of departure of imaged height is an amount of departure of the actual imaged height from the theoretical imaged height.

Figure 16C:
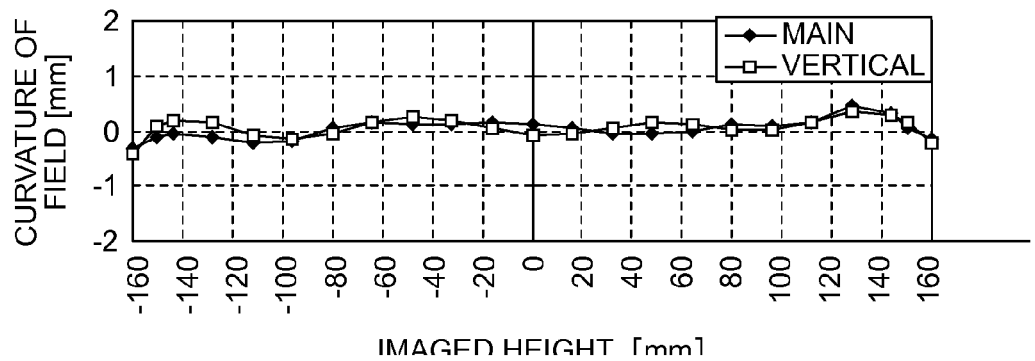
FIG. 16C shows a relationship between imaged height and curvature of field in the scanning optical system of Example 4.

FIG. 16C shows a relationship between imaged height and curvature of field in the scanning optical system of Example 4. The horizontal axis of FIG. 16C represents imaged height while the vertical axis represents curvature of field. In FIG. 16C, "main" and "vertical" represent the main scanning direction and the vertical scanning direction, respectively.

The maximum value of thickness t in the optical axis direction of the second scanner lens 411b is 5.71 millimeters. Since lateral magnification m is 12.0, α(m) is 1.75 according to Expression (2). Beam diameter a in the vertical scanning direction is 3.6 millimeters. When $(b_0/t)$ is set to 0.7, width h in the vertical scanning direction of the second scanner lens 411b is obtained as below according to Expressions (1) and (3).

$$h = a + 2 \cdot \alpha(m) \cdot (b_0/t) \cdot t$$
$$= a + 2 \cdot 1.75 \cdot 0.7 \cdot 5.71$$
$$= a + 13.99$$
$$= 17.59 \text{ (millimeters)}$$

Example 5

Figure 17A:
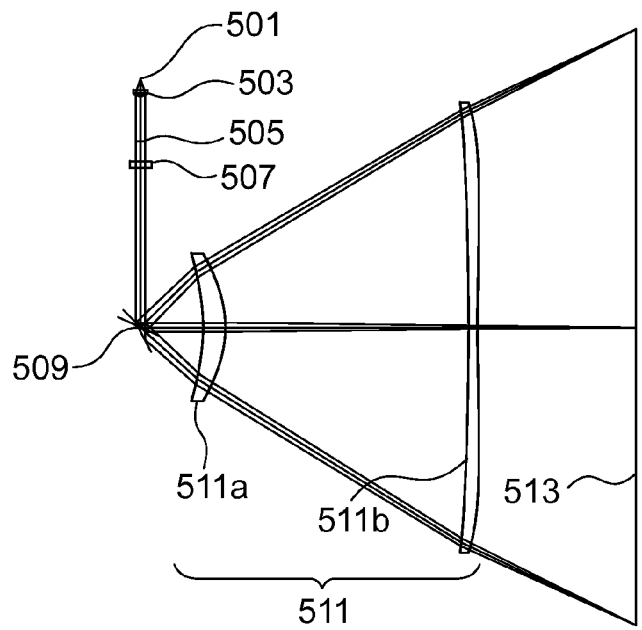
FIG. 17A is a cross-sectional view of the scanning optical system of Example 5.

FIG. 17A is a cross-sectional view of the scanning optical system of Example 5. The cross section is in the main scanning direction and contains the optical axis. Light emitted by a laser diode light source 501 is collimated by a collimator lens 503, passes through a diaphragm 505 and a cylindrical lens 507, is reflected by a polygon mirror 509, passes through a first scanner lens 511a and a second scanner lens 511b, and collected on a scanned surface 513. The first scanner lens 511a is made of polyolefine resin while the second scanner lens 511b is made of poly-methyl methacrylate resin.

The surface on the polygon mirror side of the first scanner lens 511a, the surface on the scanned surface side of the first scanner lens 511a, the surface on the polygon mirror side of the second scanner lens 511b, and the surface on the scanned surface side of the second scanner lens 511b are defined as a first surface, a second surface, a third surface and a fourth surface, respectively.

Values for symbols are as below.

t1: 12 mm t2: 3.2 mm n1: 1.504 n2: 1.486 d1: 30.35 mm d2: 159.5 mm

L: 240 mm f: 200 mm

Table 6 shows values of constants and coefficients of the first to fourth surfaces.

TABLE 6

| Type of surface | First surface Toric surface | Second surface Toric surface | Third surface Toric surface | Fourth surface Toric surface |
|---|---|---|---|---|
| Ry | −113.165 | −52.924 | −705.040 | 1222.242 |
| K | 3.047 | −0.976 | 1.051 | 3.610 |
| A3 | 0 | 0 | 0 | 0 |
| A4 | 1.753E−06 | 2.949E−07 | 6.114E−08 | −9.137E−08 |
| A5 | 0 | 0 | 0 | 0 |
| A6 | −6.217E−10 | 6.909E−11 | −1.206E−12 | 5.877E−12 |

TABLE 6-continued

| Type of surface | First surface Toric surface | Second surface Toric surface | Third surface Toric surface | Fourth surface Toric surface |
|---|---|---|---|---|
| A7 | 0 | 0 | 0 | 0 |
| A8 | 1.230E−13 | −1.491E−13 | −1.452E−16 | −3.541E−16 |
| A9 | 0 | 0 | 0 | 0 |
| A10 | 0 | 0 | 4.314E−21 | 5.785E−21 |
| rx(0) | Infinity | Infinity | 65.594 | −40.635 |
| B1 | 0 | 0 | 0 | 2.071E−03 |
| B2 | 0 | 0 | 3.338E−03 | −7.698E−04 |
| B3 | 0 | 0 | 0 | 1.326E−07 |
| B4 | 0 | 0 | −1.602E−07 | 8.515E−09 |
| B5 | 0 | 0 | 0 | 0 |
| B6 | 0 | 0 | 0 | 0 |

Figure 17B:
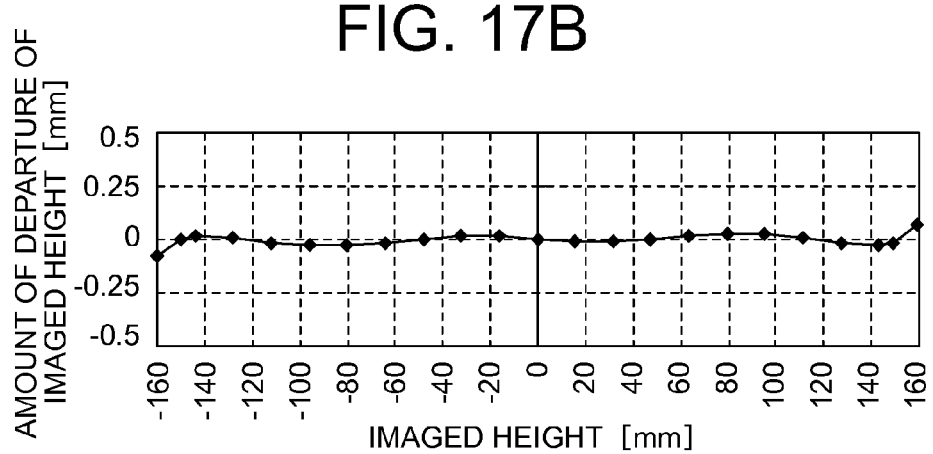
FIG. 17B shows a relationship between imaged height and an amount of departure of imaged height in the scanning optical system of Example 5.

FIG. 17B shows a relationship between imaged height and an amount of departure of imaged height in the scanning optical system of Example 5. The horizontal axis of FIG. 17B represents imaged height while the vertical axis represents an amount of departure of imaged height. When theoretical imaged height on the scanned surface is represented as Y [millimeters], deflection angle is represented as θ [degrees] and distance is represented as f [millimeters], the following expression holds.

$$Y = f \cdot \theta$$

The amount of departure of imaged height is an amount of departure of the actual imaged height from the theoretical imaged height.

Figure 17C:
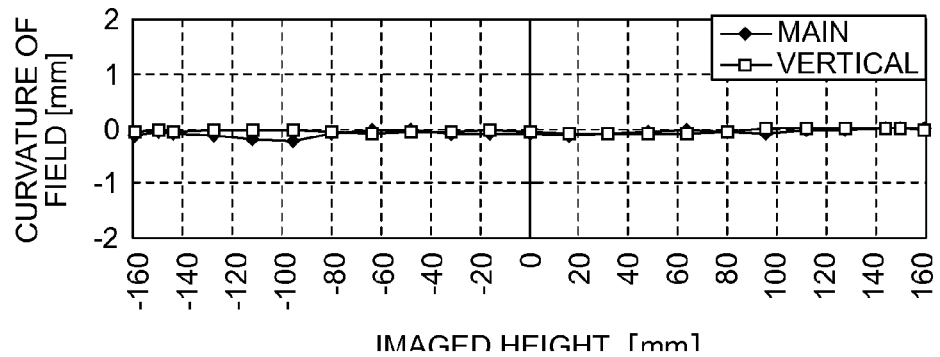
FIG. 17C shows a relationship between imaged height and curvature of field in the scanning optical system of Example 5.

FIG. 17C shows a relationship between imaged height and curvature of field in the scanning optical system of Example 5. The horizontal axis of FIG. 17C represents imaged height while the vertical axis represents curvature of field. In FIG. 17C, "main" and "vertical" represent the main scanning direction and the vertical scanning direction, respectively.

The maximum value of thickness t in the optical axis direction of the second scanner lens $511b$ is 5.76 millimeters. Since lateral magnification m is 0.5, α(m) is 0.79 according to Expression (2) and FIG. 11. Beam diameter a in the vertical scanning direction is 1.7 millimeters. When $(b_0/t)$ is set to 0.7, width h in the vertical scanning direction of the second scanner lens $511b$ is obtained as below according to Expressions (1) and (3).

$$h = a + 2 \cdot \alpha(m) \cdot (b_0/t) \cdot t$$
$$= a + 2 \cdot 0.79 \cdot 0.7 \cdot 5.76$$
$$= a + 6.37$$
$$= 8.07 \text{ (millimeters)}$$

Example 6

Figure 18A:
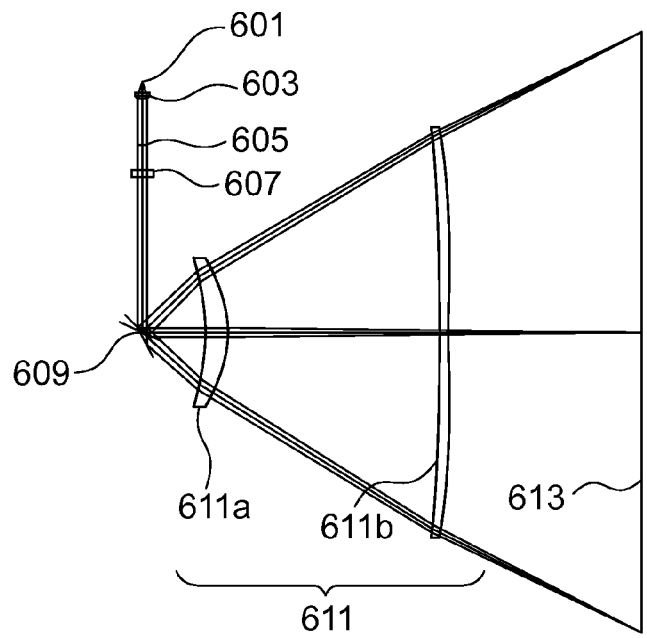
FIG. 18A is a cross-sectional view of the scanning optical system of Example 6.

FIG. 18A is a cross-sectional view of the scanning optical system of Example 6. The cross section is in the main scanning direction and contains the optical axis. Light emitted by a laser diode light source 601 is collimated by a collimator lens 603, passes through a diaphragm 605 and a cylindrical lens 607, is reflected by a polygon mirror 609, passes through a first scanner lens 611a and a second scanner lens 611b, and collected on a scanned surface 613. The first scanner lens 611a is made of polyolefine resin while the second scanner lens 611b is made of poly-methyl methacrylate resin.

The surface on the polygon mirror side of the first scanner lens 611a, the surface on the scanned surface side of the first scanner lens 611a, the surface on the polygon mirror side of the second scanner lens 611b, and the surface on the scanned surface side of the second scanner lens 611b are defined as a first surface, a second surface, a third surface and a fourth surface, respectively.

Values for symbols are as below.

t1: 12 mm t2: 3.4 mm n1: 1.504 n2: 1.486 d1: 29.6 mm d2: 140.9 mm

L: 240 mm f: 200 mm

Table 7 shows values of constants and coefficients of the first to fourth surfaces.

TABLE 7

| Type of surface | First surface Toric surface | Second surface Toric surface | Third surface Toric surface | Fourth surface Toric surface |
|---|---|---|---|---|
| R | −105.929 | −51.124 | −586.667 | 2753.729 |
| k | 2.946 | −1.031 | 8.649 | −7.902 |
| A3 | 0 | 0 | 0 | 0 |
| A4 | 1.767E−06 | 2.204E−07 | 5.848E−08 | −1.241E−07 |
| A5 | 0 | 0 | 0 | 0 |
| A6 | −5.922E−10 | 8.407E−11 | −1.541E−12 | 7.518E−12 |
| A7 | 0 | 0 | 0 | 0 |
| A8 | 1.274E−13 | −1.659E−13 | −9.351E−17 | −3.951E−16 |
| A9 | 0 | 0 | 0 | 0 |
| A10 | 0 | 0 | 3.914E−21 | 6.404E−21 |
| rx(0) | Infinity | Infinity | 63.374 | −48.190 |
| B1 | 0 | 0 | 0 | 3.852E−03 |

TABLE 7-continued

| Type of surface | First surface Toric surface | Second surface Toric surface | Third surface Toric surface | Fourth surface Toric surface |
|---|---|---|---|---|
| B2 | 0 | 0 | 4.978E−03 | −4.434E−04 |
| B3 | 0 | 0 | 0 | 2.369E−07 |
| B4 | 0 | 0 | −2.620E−07 | −2.847E−08 |
| B5 | 0 | 0 | 0 | 0 |
| B6 | 0 | 0 | 0 | 0 |

Figure 18B:
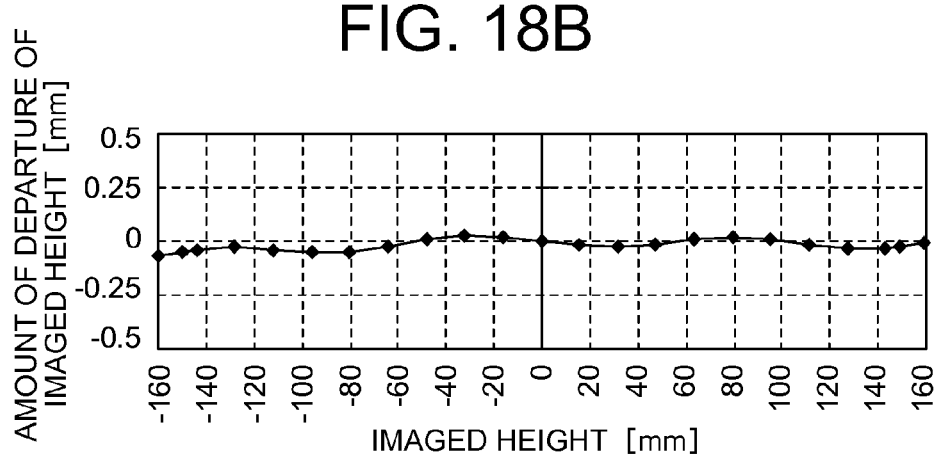
FIG. 18B shows a relationship between imaged height and an amount of departure of imaged height in the scanning optical system of Example 6.

FIG. 18B shows a relationship between imaged height and an amount of departure of imaged height in the scanning optical system of Example 6. The horizontal axis of FIG. 18B represents imaged height while the vertical axis represents an amount of departure of imaged height. When theoretical imaged height on the scanned surface is represented as Y [millimeters], deflection angle is represented as θ [degrees] and distance is represented as f [millimeters], the following expression holds.

$$Y = f \cdot \theta$$

The amount of departure of imaged height is an amount of departure of the actual imaged height from the theoretical imaged height.

Figure 18C:
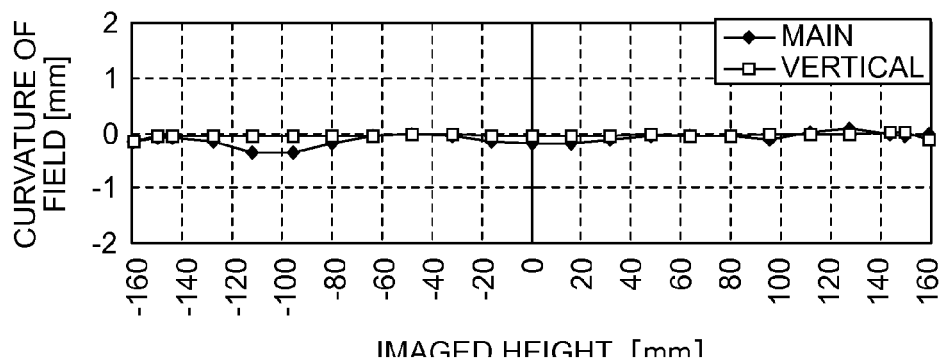
FIG. 18C shows a relationship between imaged height and curvature of field in the scanning optical system of Example 6.

FIG. 18C shows a relationship between imaged height and curvature of field in the scanning optical system of Example 6. The horizontal axis of FIG. 18C represents imaged height while the vertical axis represents curvature of field. In FIG. 18C, "main" and "vertical" represent the main scanning direction and the vertical scanning direction, respectively.

The maximum value of thickness t in the optical axis direction of the second scanner lens 611b is 5.22 millimeters. Since lateral magnification m is 0.7, α(m) is 0.89 according to Expression (2) and FIG. 11. Beam diameter a in the vertical scanning direction is 2.1 millimeters. When $(b_0/t)$ is set to 0.7, width h in the vertical scanning direction of the second scanner lens 611b is obtained as below according to Expressions (1) and (3).

$$\begin{aligned} h &= a + 2 \cdot \alpha(m) \cdot (b_0/t) \cdot t \\ &= a + 2 \cdot 0.89 \cdot 0.7 \cdot 5.22 \\ &= a + 6.50 \\ &= 8.60 \text{ (millimeters)} \end{aligned}$$

Example 7

Figure 19A:
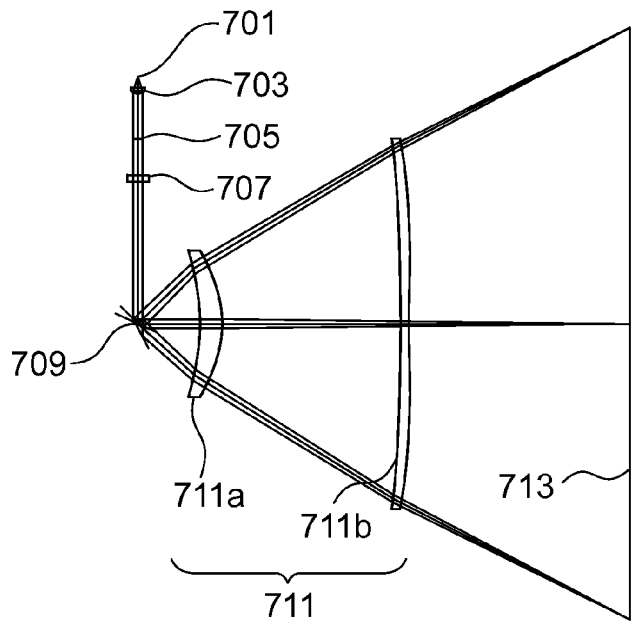
FIG. 19A is a cross-sectional view of the scanning optical system of Example 7.

FIG. 19A is a cross-sectional view of the scanning optical system of Example 7. The cross section is in the main scanning direction and contains the optical axis. Light emitted by a laser diode light source 701 is collimated by a collimator lens 703, passes through a diaphragm 705 and a cylindrical lens 707, is reflected by a polygon mirror 709, passes through a first scanner lens 711a and a second scanner lens 711b, and collected on a scanned surface 713. The first scanner lens 711a is made of polyolefine resin while the second scanner lens 711b is made of poly-methyl methacrylate resin.

The surface on the polygon mirror side of the first scanner lens 711a, the surface on the scanned surface side of the first scanner lens 711a, the surface on the polygon mirror side of the second scanner lens 711b, and the surface on the scanned surface side of the second scanner lens 711b are defined as a first surface, a second surface, a third surface and a fourth surface, respectively.

Values for symbols are as below.

t1: 12 mm t2: 4 mm n1: 1.504 n2: 1.486 d1: 27.7 mm d2: 126.4 mm

L: 240 mm f: 200 mm

Table 8 shows values of constants and coefficients of the first to fourth surfaces.

TABLE 8

| Type of surface | First surface Toric surface | Second surface Toric surface | Third surface Toric surface | Fourth surface Toric surface |
|---|---|---|---|---|
| R | −100.386 | −50.014 | −602.764 | 20722.260 |
| k | 2.922 | −0.987 | 11.185 | −9.912 |
| A3 | 0 | 0 | 0 | 0 |
| A4 | 1.767E−06 | 2.319E−07 | 7.332E−08 | −1.286E−07 |
| A5 | 0 | 0 | 0 | 0 |
| A6 | −5.433E−10 | 1.055E−10 | −2.751E−12 | 8.118E−12 |
| A7 | 0 | 0 | 0 | 0 |
| A8 | 1.184E−13 | −1.953E−13 | −1.090E−16 | −4.349E−16 |
| A9 | 0 | 0 | 0 | 0 |
| A10 | 0 | 0 | 3.717E−21 | 1.272E−21 |
| rx(0) | Infinity | Infinity | 51.226 | −62.329 |
| B1 | 0 | 0 | 0 | 7.965E−03 |
| B2 | 0 | 0 | 4.083E−03 | −3.232E−04 |
| B3 | 0 | 0 | 0 | 8.773E−07 |
| B4 | 0 | 0 | −2.847E−07 | −1.712E−07 |
| B5 | 0 | 0 | 0 | 0 |
| B6 | 0 | 0 | 0 | 0 |

Figure 19B:
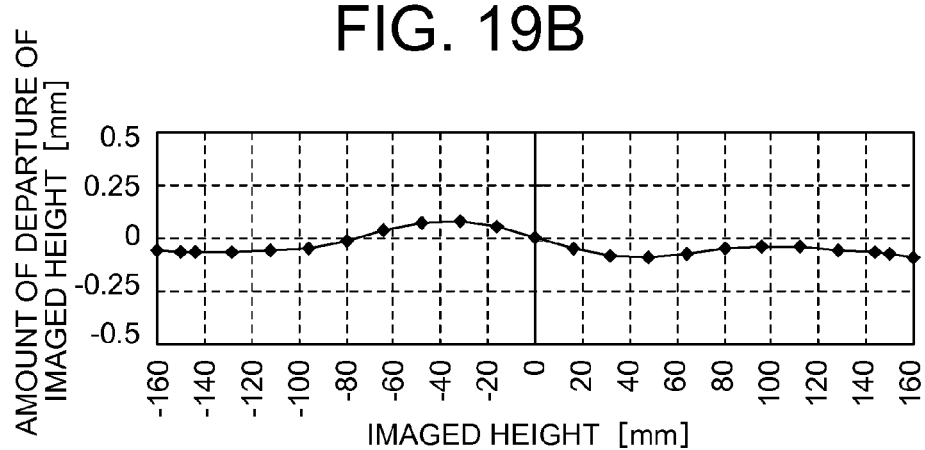
FIG. 19B shows a relationship between imaged height and an amount of departure of imaged height in the scanning optical system of Example 7.

FIG. 19B shows a relationship between imaged height and an amount of departure of imaged height in the scanning optical system of Example 7. The horizontal axis of FIG. 19B represents imaged height while the vertical axis represents an amount of departure of imaged height. When theoretical imaged height on the scanned surface is represented as Y [millimeters], deflection angle is represented as θ[degrees] and distance is represented as f [millimeters], the following expression holds.

$$Y = f \cdot \theta$$

The amount of departure of imaged height is an amount of departure of the actual imaged height from the theoretical imaged height.

Figure 19C:
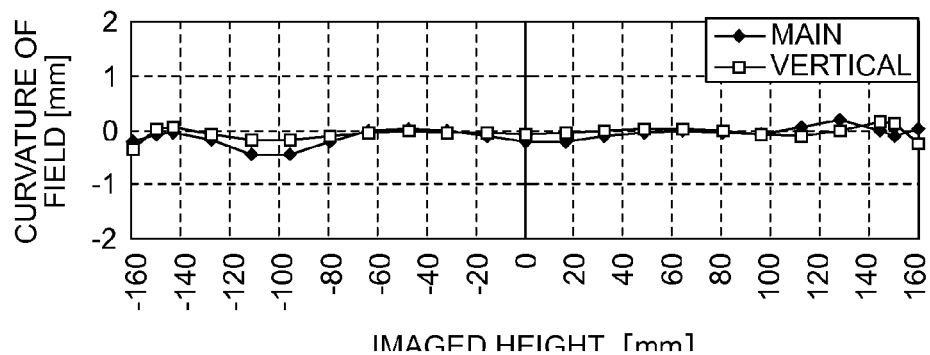
FIG. 19C shows a relationship between imaged height and curvature of field in the scanning optical system of Example 7.

FIG. 19C shows a relationship between imaged height and curvature of field in the scanning optical system of Example 7. The horizontal axis of FIG. 19C represents imaged height while the vertical axis represents curvature of field. In FIG. 19C, "main" and "vertical" represent the main scanning direction and the vertical scanning direction, respectively.

The maximum value of thickness t in the optical axis direction of the second scanner lens 711b is 5.08 millimeters. Since lateral magnification m is 0.9, α(m) is 0.97 according to Expression (2) and FIG. 11. Beam diameter a in the vertical scanning direction is 2.6 millimeters. When ($b_0/t$) is set to 0.7, width h in the vertical scanning direction of the second scanner lens 711b is obtained as below according to Expressions (1) and (3).

$$\begin{aligned} h &= a + 2 \cdot \alpha(m) \cdot (b_0/t) \cdot t \\ &= a + 2 \cdot 0.97 \cdot 0.7 \cdot 5.08 \\ &= a + 6.90 \\ &= 9.50 \text{ (millimeters)} \end{aligned}$$

Example 8

Figure 20A:
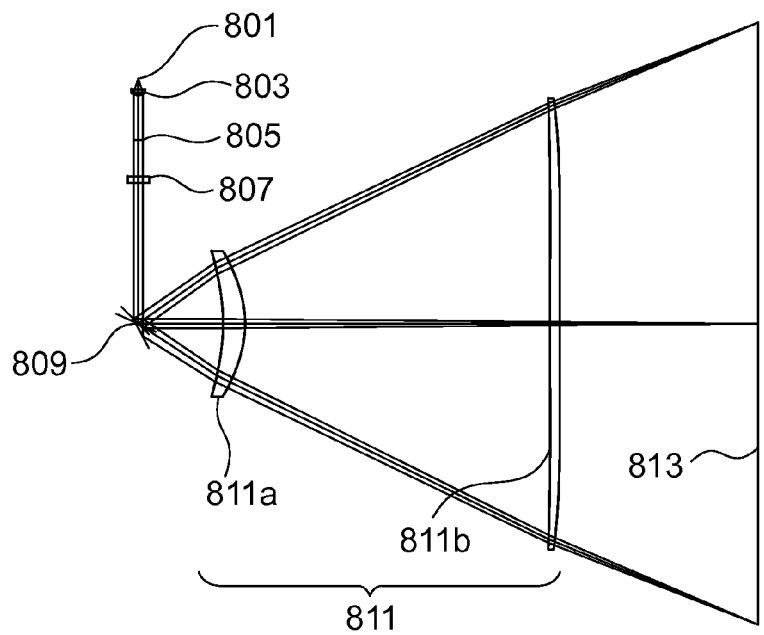
FIG. 20A is a cross-sectional view of the scanning optical system of Example 8.

FIG. 20A is a cross-sectional view of the scanning optical system of Example 8. The cross section is in the main scanning direction and contains the optical axis. Light emitted by a laser diode light source 801 is collimated by a collimator lens 803, passes through a diaphragm 805 and a cylindrical lens 807, is reflected by a polygon mirror 809, passes through a first scanner lens 811a and a second scanner lens 811b, and collected on a scanned surface 813. The first scanner lens 811a is made of polyolefine resin while the second scanner lens 811b is made of poly-methyl methacrylate resin.

The surface on the polygon mirror side of the first scanner lens 811a, the surface on the scanned surface side of the first scanner lens 811a, the surface on the polygon mirror side of the second scanner lens 811b, and the surface on the scanned surface side of the second scanner lens 811b are defined as a first surface, a second surface, a third surface and a fourth surface, respectively.

Values for symbols are as below.

t1: 9 mm
t2: 4.8 mm
n1: 1.504
n2: 1.486
d1: 40.6 mm
d2: 198 mm
L: 300 mm
f: 248 mm

Table 9 shows values of constants and coefficients of the first to fourth surfaces.

TABLE 9

| Type of surface | First surface Toric surface | Second surface Toric surface | Third surface Toric surface | Fourth surface Toric surface |
|---|---|---|---|---|
| R | −103.723 | −57.224 | −1631.806 | 2960.151 |
| k | 3.067 | −1.305 | 7.550 | 9.985 |
| A3 | 0 | 0 | 0 | 0 |
| A4 | 1.775E−06 | 2.920E−07 | 3.506E−08 | −5.547E−08 |
| A5 | 0 | 0 | 0 | 0 |
| A6 | −6.750E−10 | −1.622E−10 | −3.246E−13 | 4.273E−12 |
| A7 | 0 | 0 | 0 | 0 |
| A8 | 1.517E−13 | −1.112E−13 | −1.511E−16 | −3.406E−16 |
| A9 | 0 | 0 | 0 | 0 |
| A10 | 0 | 0 | 5.592E−21 | 8.724E−21 |
| rx(0) | Infinity | Infinity | 76.958 | −53.452 |
| B1 | 0 | 0 | 0.000E+00 | 1.946E−03 |
| B2 | 0 | 0 | 4.656E−03 | 4.542E−04 |
| B3 | 0 | 0 | 0.000E+00 | −4.090E−08 |
| B4 | 0 | 0 | 1.486E−07 | 2.810E−09 |
| B5 | 0 | 0 | 0 | 0 |
| B6 | 0 | 0 | 0 | 0 |

Figure 20B:
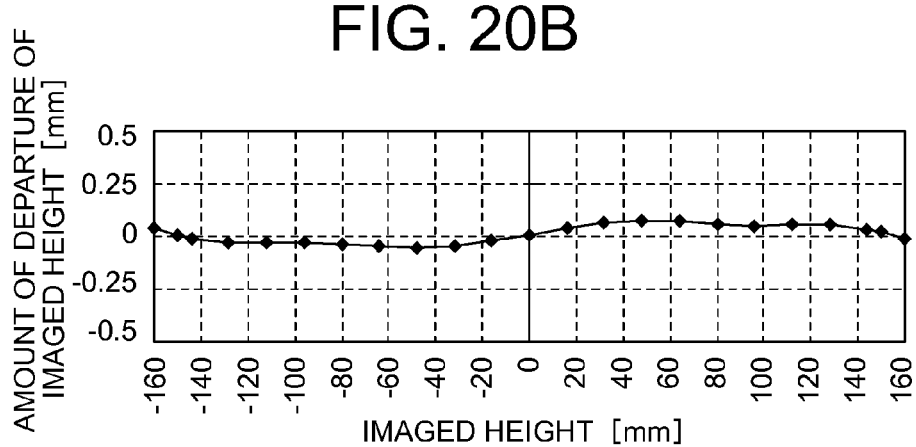
FIG. 20B shows a relationship between imaged height and an amount of departure of imaged height in the scanning optical system of Example 8.

FIG. 20B shows a relationship between imaged height and an amount of departure of imaged height in the scanning optical system of Example 8. The horizontal axis of FIG. 20B represents imaged height while the vertical axis represents an amount of departure of imaged height. When theoretical imaged height on the scanned surface is represented as Y [millimeters], deflection angle is represented as θ [degrees] and distance is represented as f [millimeters], the following expression holds.

$$Y = f \cdot \theta$$

The amount of departure of imaged height is an amount of departure of the actual imaged height from the theoretical imaged height.

Figure 20C:
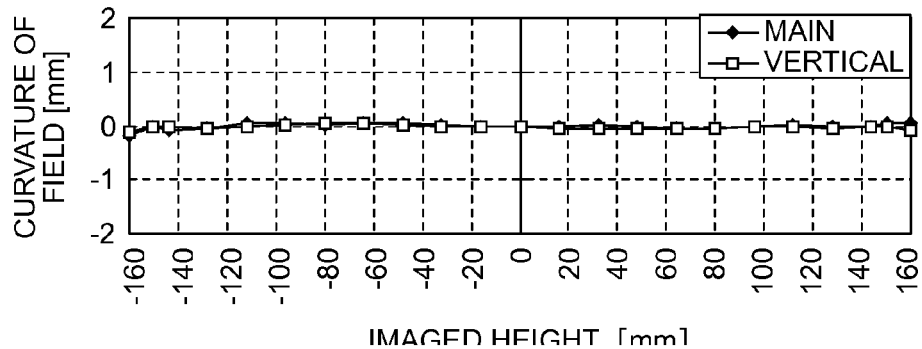
FIG. 20C shows a relationship between imaged height and curvature of field in the scanning optical system of Example 8.

FIG. 20C shows a relationship between imaged height and curvature of field in the scanning optical system of Example 8. The horizontal axis of FIG. 20C represents imaged height while the vertical axis represents curvature of field. In FIG. 20C, "main" and "vertical" represent the main scanning direction and the vertical scanning direction, respectively.

The maximum value of thickness t in the optical axis direction of the second scanner lens 811b is 5.53 millimeters. Since lateral magnification m is 0.5, α(m) is 0.79 according to Expression (2) and FIG. 11. Beam diameter a in the vertical scanning direction is 2 millimeters. When ($b_0/t$) is set to 0.7, width h in the vertical scanning direction of the second scanner lens 811b is obtained as below according to Expressions (1) and (3).

$$h = a + 2 \cdot \alpha(m) \cdot (b_0/t) \cdot t$$
$$= a + 2 \cdot 0.79 \cdot 0.7 \cdot 5.53$$
$$= a + 6.12$$
$$= 8.12 \text{ (millimeters)}$$

What is claimed is:

1. A method for producing a scanner lens of plastic used in an optical scanning system, the method comprising the steps of:
    obtaining lateral magnification of the optical scanning system;
    obtaining the maximum value of thickness in the optical axis direction of the scanner lens;
    obtaining allowance b on one side and beam diameter a in the vertical scanning direction in the scanner lens;
    obtaining width h in the vertical scanning direction of the scanner lens by the following expression $h=a+2b$;

wherein the allowance b is a product of the maximum value of thickness in the optical axis direction of the scanner lens and a coefficient, and the coefficient is determined according to the lateral magnification of the optical scanning system in such a way that the maximum value of movement of the focal point of the scanner lens due to moisture absorption is made smaller than or equal to a predetermined value.

2. A method for producing a scanner lens according to claim 1, wherein the coefficient is determined using simulation.

3. A method for producing a scanner lens according to claim 1, wherein the coefficient is determined experimentally.

4. A scanner lens of plastic used in an optical scanning system wherein width h in the vertical scanning direction of the scanner lens is determined by the following expression $h=a+2b$ where a represents beam diameter in the vertical scanning direction in the scanner lens and b represents allowance on one side,
    wherein the allowance b is a product of the maximum value of thickness in the optical axis direction of the scanner lens and a coefficient, and the coefficient is determined according to the lateral magnification of the optical scanning system in such a way that the maximum value of movement of the focal point of the scanner lens due to moisture absorption is made smaller than or equal to a predetermined value.

* * * * *